(12) United States Patent
Fusakawa et al.

(10) Patent No.: US 10,269,233 B2
(45) Date of Patent: Apr. 23, 2019

(54) PRESENCE AND ABSENCE PREDICTION METHOD AND PRESENCE AND ABSENCE PREDICTION APPARATUS

(71) Applicant: Panasonic Intellectual Property Corporation of America, Torrance, CA (US)

(72) Inventors: Kazue Fusakawa, Kanagawa (JP); Tomoaki Ohira, Tokyo (JP); Fumiaki Suzuki, Tokyo (JP); Kumi Harada, Osaka (JP); Hayashi Ito, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 203 days.

(21) Appl. No.: 15/210,877

(22) Filed: Jul. 14, 2016

(65) Prior Publication Data

US 2017/0092102 A1    Mar. 30, 2017

(30) Foreign Application Priority Data

Sep. 24, 2015   (JP) ................. 2015-187098

(51) Int. Cl.
| | |
|---|---|
| *G08B 23/00* | (2006.01) |
| *G08B 21/22* | (2006.01) |
| *G06Q 50/06* | (2012.01) |
| *G06Q 10/06* | (2012.01) |

(52) U.S. Cl.
CPC ............. *G08B 21/22* (2013.01); *G06Q 10/06* (2013.01); *G06Q 50/06* (2013.01)

(58) Field of Classification Search
CPC ........ G08B 21/22; G06Q 50/60; G06Q 10/06; G06Q 50/06
USPC ........................................ 340/573.1
See application file for complete search history.

(56) References Cited

U.S. PATENT DOCUMENTS

| | | | | |
|---|---|---|---|---|
| 2008/0183866 | A1* | 7/2008 | Maeda | H04L 67/24 709/224 |
| 2012/0066168 | A1* | 3/2012 | Fadell | G05B 15/02 706/52 |
| 2013/0030732 | A1* | 1/2013 | Shetty | G01D 4/002 702/62 |

(Continued)

FOREIGN PATENT DOCUMENTS

JP        2012-181789        9/2012

*Primary Examiner* — Naomi J Small
(74) *Attorney, Agent, or Firm* — Greenblum & Bernstein, P.L.C.

(57) ABSTRACT

A presence and absence prediction method includes: acquiring electric power data of a predetermined building at a first point in time; acquiring learning data obtained by learning, for each predetermined time period, a correspondence relationship between electric power data of the building at a point in time preceding the first point in time and information indicating whether the person was actually present in the building; predicting, on the basis of the electric power data of the building at the first point in time and the learning data, whether the person is present in the building; and generating presence and absence information that indicates a result of the prediction and outputting the presence and absence information to a predetermined terminal.

19 Claims, 14 Drawing Sheets

(56) References Cited

U.S. PATENT DOCUMENTS

| | | | |
|---|---|---|---|
| 2015/0066799 A1* | 3/2015 | Scipioni | G06Q 10/0833 705/337 |
| 2015/0142140 A1* | 5/2015 | Yamaguchi | G06N 7/005 700/50 |
| 2016/0104113 A1* | 4/2016 | Gorlin | G06Q 10/08355 705/338 |
| 2016/0165650 A1* | 6/2016 | Kim | H04W 12/06 370/329 |
| 2016/0335865 A1* | 11/2016 | Sayavong | G06F 16/245 |
| 2017/0048280 A1* | 2/2017 | Logue | H04L 12/2818 |

* cited by examiner

PRESENCE AND ABSENCE PREDICTION METHOD AND PRESENCE AND ABSENCE PREDICTION APPARATUS

BACKGROUND

1. Technical Field

The present disclosure relates to a presence and absence prediction method and a presence and absence prediction apparatus for predicting the presence or absence of a human in a predetermined place.

2. Description of the Related Art

There has conventionally been known a technology for predicting the presence or absence of a person on the basis of data representing an amount of power consumption in a predetermined place (e.g., a home, a workplace, or the like) and notifies a result of the prediction to a terminal of a home-delivery company who are going to visit the home.

For example, Japanese Unexamined Patent Application Publication No. 2012-181789 discloses a technology (hereinafter referred to as "conventional technology") for recording a past amount of power usage per unit time in a predetermined home, for, upon receiving an inquiry from a home-delivery company, calculating the probability of presence so that the probability of presence is higher as a past amount of power usage corresponding to an estimated time of delivery is closer to the maximum value, and for notifying the probability of presence to a terminal of the home-delivery company.

The probability of presence calculated by the conventional technology takes on a large value in a case where the past amount of power usage is large and takes on a small value in a case where the past amount of power usage is small. However, in general, there is a case where a person is absent even when the amount of power usage is large or a case where the person is present even when the amount of power usage is small. The conventional technology does not anticipate such cases and is therefore undesirably low in prediction accuracy.

SUMMARY

One non-limiting and exemplary embodiment provides a presence and absence prediction method and a presence and absence prediction apparatus that make it possible to achieve highly accurate presence and absence prediction based on electric power data.

In one general aspect, the techniques disclosed here feature a presence and absence prediction method including: acquiring electric power data of a predetermined building at a first point in time; acquiring learning data obtained by learning, for each predetermined time period, a correspondence relationship between electric power data of the building at a point in time preceding the first point in time and information indicating whether the person was actually present in the building; predicting, on the basis of the electric power data of the building at the first point in time and the learning data, whether the person is present in the building; and generating presence and absence information that indicates a result of the prediction and outputting the presence and absence information to a predetermined terminal.

The present disclosure makes it possible to achieve highly accurate presence and absence prediction based on electric power data.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

In the following, embodiments of the present disclosure are described with reference to the drawings. Note, however, that the same components and processing steps are given the

Embodiment 1

Embodiment 1 of the present invention is described.

<Configuration of Presence and Absence Prediction System>

Figure 1:
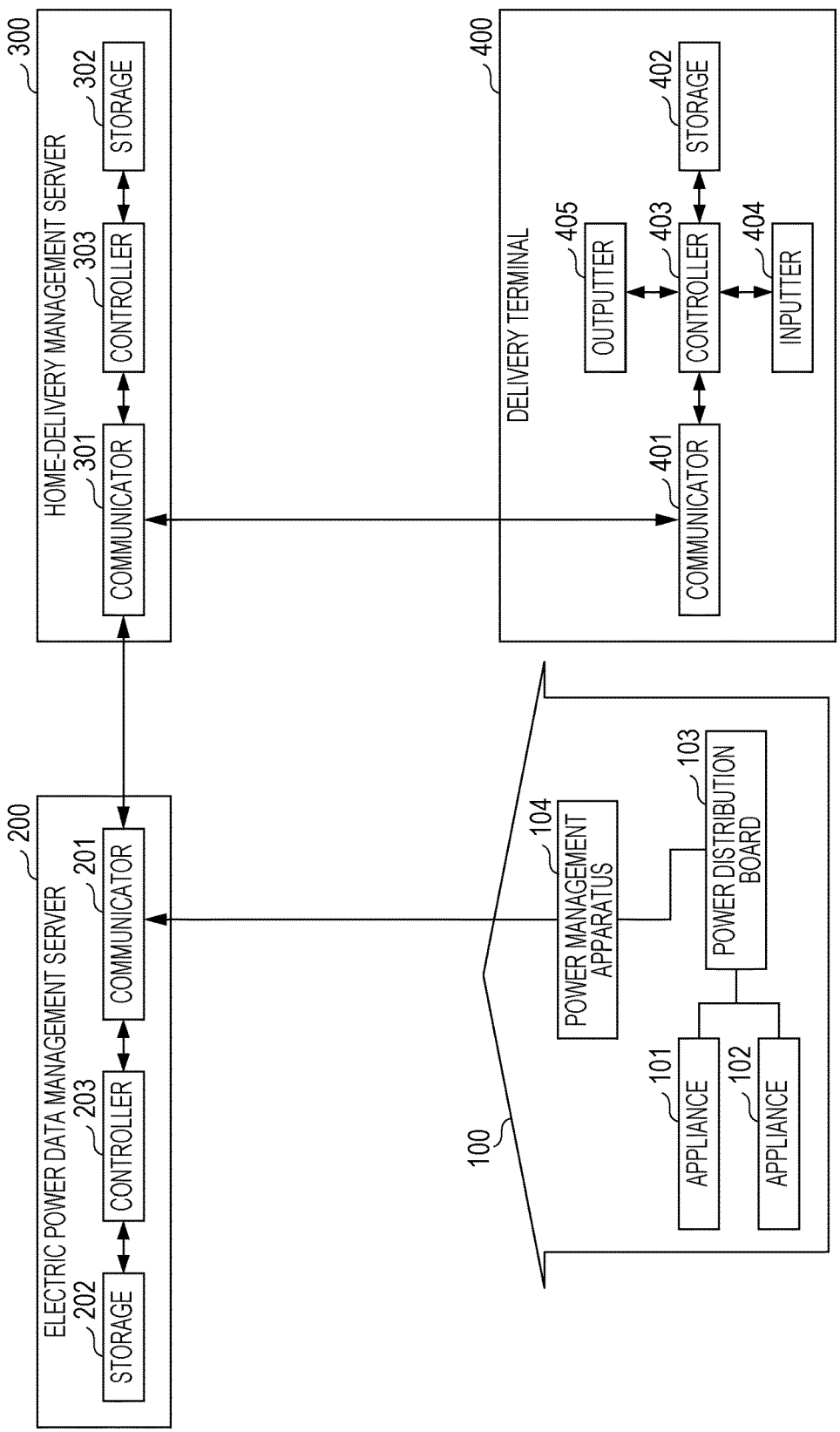
FIG. 1 is a block diagram showing an example of a configuration of a presence and absence prediction system according to Embodiment 1 of the present disclosure.

First, a configuration of a presence and absence prediction system according to Embodiment 1 of the present disclosure is described with reference to FIG. 1. FIG. 1 is a block diagram showing an example of the configuration of the presence and absence prediction system according to Embodiment 1.

As shown in FIG. 1, the presence and absence prediction system according to Embodiment 1 includes an appliance 101, an appliance 102, a power distribution board 103, a power management apparatus 104, an electric power data management server 200, a home-delivery management server 300, and a delivery terminal 400.

First, the appliance 101, the appliance 102, the power distribution board 103, and the power management apparatus 104, which are installed in a building 100, are described.

The building 100 is for example a detached house. It should be noted that, without being limited to a detached house, the building 100 may for example be an apartment for exclusive use in an apartment house, a whole office building, or a section for exclusive use in an office building.

In the building 100, the appliances 101 and 102, the power distribution board 103, and the power management apparatus 104 are installed. The appliances 101 and 102 are electrically connected to the power distribution board 103. Further, the power distribution board 103 is electrically connected to the power management apparatus 104.

The appliances 101 and 102 are electrical apparatuses that operate on electric power that is supplied from the power distribution board 103. Examples of the appliances 101 and 102 include a television, a refrigerator, a washing machine, a lighting apparatus, an air conditioner, and the like. Although FIG. 1 shows only two appliances 101 and 102, there may be two or more appliances in the building 100.

The power management apparatus 104 acquires electric power data of each branch circuit (not illustrated) from the power distribution board 103 every predetermined period of time (e.g., 1 second, several seconds, 1 minute, or the like) and summates these pieces of electric power data. The electric power data is for example data that represents an amount of power consumption or data that represents a waveform of power consumption. Embodiment 1 is described below by taking, as an example, a case where the electric power data is data that represents an amount of power consumption.

Moreover, the power management apparatus 104 associates acquisition time information, building identification information, and the electric power data thus summated with one another and transmits these pieces of information and data to the electric power data management server 200 via a predetermined network. The acquisition time information is information that indicates the point in time where the electric power data was acquired. The building identification information is information that enables the building 100 to be identified.

In Embodiment 1, the predetermined network may be a wired network, a wireless network, or a combination of a wired network and a wireless network.

It should be noted that although the foregoing description assumes that the power management apparatus 104 summates the electric power data of each branch circuit, the power management apparatus 104 may alternatively summate electric power data of each of the appliances 101 and 102. In that case, the power management apparatus 104 may receive the electric power data directly from the appliances 101 and 102.

Alternatively, in a case where the appliances 101 and 102 have network communication functions, the appliances 101 and 102 may transmit the electric power data to the electric power data management server 200 via the predetermined network. In that case, the electric power data management server 200 summates the electric power data of each of the appliances.

In the foregoing, the appliance 101, the appliance 102, the power distribution board 103, and the power management apparatus 104 has been described.

Next, the electric power data management server 200 is described.

The electric power data management server 200 is for example a server apparatus possessed and operated by a company that manages electric power data for each building 100. The electric power data management server 200 includes a communicator 201, a storage 202, and a controller 203.

The communicator 201 is a communication device that transmits and receives various types of information to and from the power management apparatus 104 and the home-delivery management server 300 via the predetermined network.

For example, the communicator 201 receives building identification information, acquisition time information, and electric power data from the power management apparatus 104.

Further, for example, the communicator 201 receives an electric power data request from the home-delivery management server 300. The electric power data request contains building identification information and current time information. The current time information is for example information that indicates a point in time where the delivery terminal 400 accepted an address designation operation performed by an employee of the home-delivery company (example of the first point in time). The address designation operation and a presence and absence information request will be described later.

The storage 202 is a storage device such as a memory or a hard disk device.

For example, in the storage 202, building identification information, acquisition time information, and electric power data that were received by the communicator 201 are stored in association with one another.

The controller 203 is a control device such as a processor that executes various types of information processing.

For example, the controller 203 associates building identification information, acquisition time information, and electric power data that the communicator 201 received from the power management apparatus 104 with one another, and stores these pieces of information and data in the storage 202.

Further, for example, the controller 203 extracts building identification information and the current time information from an electric power data request that the communicator 201 received from the home-delivery management server 300, and searches the storage 202 for building identification information and acquisition time information that correspond to the building identification information and current time information thus extracted. Then, the controller 203 reads out, from the storage 202, electric power data with which the building identification information and acquisition time information thus found are associated. Then, the controller 203 controls the communicator 201 to transmit the electric power data thus read out to the home-delivery management server 300. This allows the electric power data to be transmitted from the communicator 201 to the home-delivery management server 300 via the predetermined network.

In the foregoing, the electric power data management server 200 has been described.

Next, the home-delivery management server 300 is described.

The home-delivery management server 300 is for example a server apparatus possessed and operated by a company (hereinafter referred to as "home-delivery company") that provides a home-delivery service (delivery service).

The home-delivery management server 300 includes a communicator 301, a storage 302, and a controller 303.

The communicator 301 is a communication device that transmits and receives various types of information to and from the electric power data management server 200 and the delivery terminal 400 via the predetermined network.

For example, the communicator 301 receives a presence and absence information request from the delivery terminal 400. As described above, the presence and absence information request contains building identification information and current time information.

Further, for example, the communicator 301 transmits an electric power data request to the electric power data management server 200. As described above, the electric power data request contains building identification information and current time information. The building identification information and the current time information are identical to the building identification information and the current time information that are contained in the presence and absence information request.

Further, for example, the communicator 301 receives electric power data from the electric power data management server 200 as a response to the electric power data request. As such, in Embodiment 1, the communicator 301 corresponds to an example of the "electric power data acquirer".

Further, for example, the communicator 301 transmits presence and absence information to the delivery terminal 400 as a response to the presence and absence information request. The presence and absence information is information that indicates a result of a prediction as to whether a person (e.g., a resident) is present in the building 100. Details of the presence and absence information will be described later.

Further, the communicator 301 receives track record information from the delivery terminal 400. The track record information is information that is used for updating the after-mentioned learning data and, for example, contains building identification information, visit time information that indicates a point in time where an employee (e.g., a person who actually delivers packages) of the home-delivery company visited the building 100, and visit result information that indicates whether the person was actually present in the building 100 when the employee of the home-delivery company visited the building 100.

The storage 302 is a storage device such as a memory or a hard disk device.

For example, in the storage 302, learning data (also referred to as "learning model" or "teacher data") is stored for each piece of building identification information. The learning data is data obtained by learning, for each predetermined time period (e.g., 30 minutes, 1 hour, or the like), a correspondence relationship between electric power data of the building 100 in the past (i.e., a point in time preceding the point in time indicated by the current time information) and information indicating whether the person was actually present in the building 100. Details of the learning data will be described later.

The controller 303 is a control device such as a processor that executes various types of information processing.

For example, the controller 303 extracts building identification information and current time information from a presence and absence information request that the communicator 301 received from the delivery terminal 400. Then, the controller 303 controls the communicator 301 to transmit an electric power data request containing the building identification information and current time information thus extracted to the electric power data management server 200. This allows the electric power data request to be transmitted from the communicator 301 to the electric power data management server 200 via the predetermined network.

Further, for example, the controller 303 reads out, from the storage 302, learning data corresponding to the building identification information and current time information extracted from the presence and absence information request. Then, the controller 303 predicts, on the basis of the learning data thus read out and electric power data that the communicator 301 received from the electric power data management server 200, whether the person is present in the building 100, and generates presence and absence information that indicates a result of the prediction. That is, in Embodiment 1, the home-delivery management server 300 corresponds to an example of the "presence and absence prediction apparatus", and the controller 303 corresponds to an example of the "predictor". It should be noted that the aforementioned process from the reading out of learning data to the generation of presence and absence information is referred to as "prediction process". Details of the prediction process will be described later.

Further, for example, the controller 303 controls the communicator 301 to transmit the presence and absence information thus generated to the delivery terminal 400. This allows the presence and absence information to be transmitted from the communicator 301 to the delivery terminal 400 via the predetermined network.

Further, for example, when the communicator 301 receives track record information from the delivery terminal 400, the controller 303 updates the learning data on the basis of the track record information. Details of this learning data update process will be described later.

In the foregoing, the home-delivery management server 300 has been described.

Next, the delivery terminal 400 is described.

The delivery terminal 400 is for example a terminal apparatus that is used by an employee of the home-delivery company. It is preferable that the delivery terminal 400 be for example a portable terminal such as a smartphone, a tablet, or a laptop personal computer. However, without being limited to a portable terminal, the delivery terminal 400 may be a stationary terminal apparatus.

The delivery terminal 400 includes a communicator 401, a storage 402, a controller 403, an inputter 404, and an outputter 405.

The communicator 401 is a communication device that transmits and receives various types of information to and from the home-delivery management server 300 via the predetermined network.

For example, the communicator 401 transmits a presence and absence information request to the home-delivery management server 300.

Further, the communicator 401 receives presence and absence information from the home-delivery management server 300 as a response to the presence and absence information request.

Further, for example, the communicator 401 transmits track record information to the home-delivery management server 300. As described above, for example, the track record information contains building identification information, visit time information, and visit result information.

The storage 402 is a storage device such as a memory or a hard disk device.

For example, in the storage 402, building identification information is stored. This building identification information is for example linked to address information indicating the address of a building 100.

The inputter 404 is an input device such as a button or a touch panel.

For example, the inputter 404 accepts an address designation operation that is performed by the employee of the home-delivery company. The address designation operation is an operation of designating the address of a building 100 that the employee of the home-delivery company is going to visit. For example, the employee of the home-delivery company performs the address designation operation before visiting the building 100.

It should be noted that, in Embodiment 1, the address designation operation serves also as an operation (hereinafter referred to as "display instruction operation) in which the employee of the home-delivery company instructs the delivery terminal 400 to display presence and absence information. Alternatively, the address designation operation and the display instruction operation may be performed separately. In that case, the point in time indicated by the current time information may be the point in time where the inputter 404 accepted the display instruction operation.

For example, the inputter 404 accepts a track record input operation that is performed by the employee of the home-delivery company. The track record input operation is an operation in which the employee of the home-delivery company inputs address information of a building 100 that the employee of the home-delivery company actually visited, visit time information that indicates the point in time where the employee of the home-delivery company visited the building 100, and visit result information that indicates whether a person was actually present in the building 100 when the employee of the home-delivery company visited the building 100. For example, the employee of the home-delivery company performs the track record input operation after having actually visited the building 100.

The outputter 405 is a display device such as a display or an audio output device such as a speaker.

For example, the outputter 405 outputs presence and absence information that the communicator 401 received from the home-delivery management server 300. Embodiment 1 is described by taking, as an example, a case where the presence and absence information is outputted in the form of a display.

The controller 403 is a control device such as a processor that executes various types of information processing.

For example, when the inputter 404 accepts an address designation operation, the controller 403 reads out, from the storage 402, building identification information associated with the address designated by the operation. Then, the controller 403 controls the communicator 401 to transmit a presence and absence information request containing the building identification information thus read out and current time information to the home-delivery management server 300. This allows the presence and absence information request to be transmitted from the communicator 401 to the home-delivery management server 300 via the predetermined network.

It should be noted that although the foregoing description assumes that, in transmitting a presence and absence information request, the controller 403 reads out building identification information from the storage 402 on the basis of the address designated by an address designation operation, the building identification information may alternatively be inputted by the employee of the home-delivery company.

Further, for example, the controller 403 control the outputter 405 to display presence and absence information that the communicator 401 received from the home-delivery management server 300. This allows the presence and absence information to be displayed by the outputter 405 to be presented to the employee of the home-delivery company.

Further, for example, when the inputter 404 accepts a track record input operation, the controller 403 reads out, from the storage 402, building identification information associated with the address inputted by the operation. Then, the controller 403 controls the communicator 401 to transmits, to the home-delivery management server 300, track record information containing the building identification information thus read out and the visit time information thus inputted. This allows the track record information to be transmitted from the communicator 401 to the home-delivery management server 300 via the predetermined network.

It should be noted that although the foregoing description assumes that, in transmitting track record information, the controller 403 reads out building identification information from the storage 402 on the basis of the address designated by a track record input operation, the building identification information may alternatively be inputted by the employee of the home-delivery company.

In the foregoing, the delivery terminal 400 has been described.

<Operation of Presence and Absence Prediction System>

Figure 2:
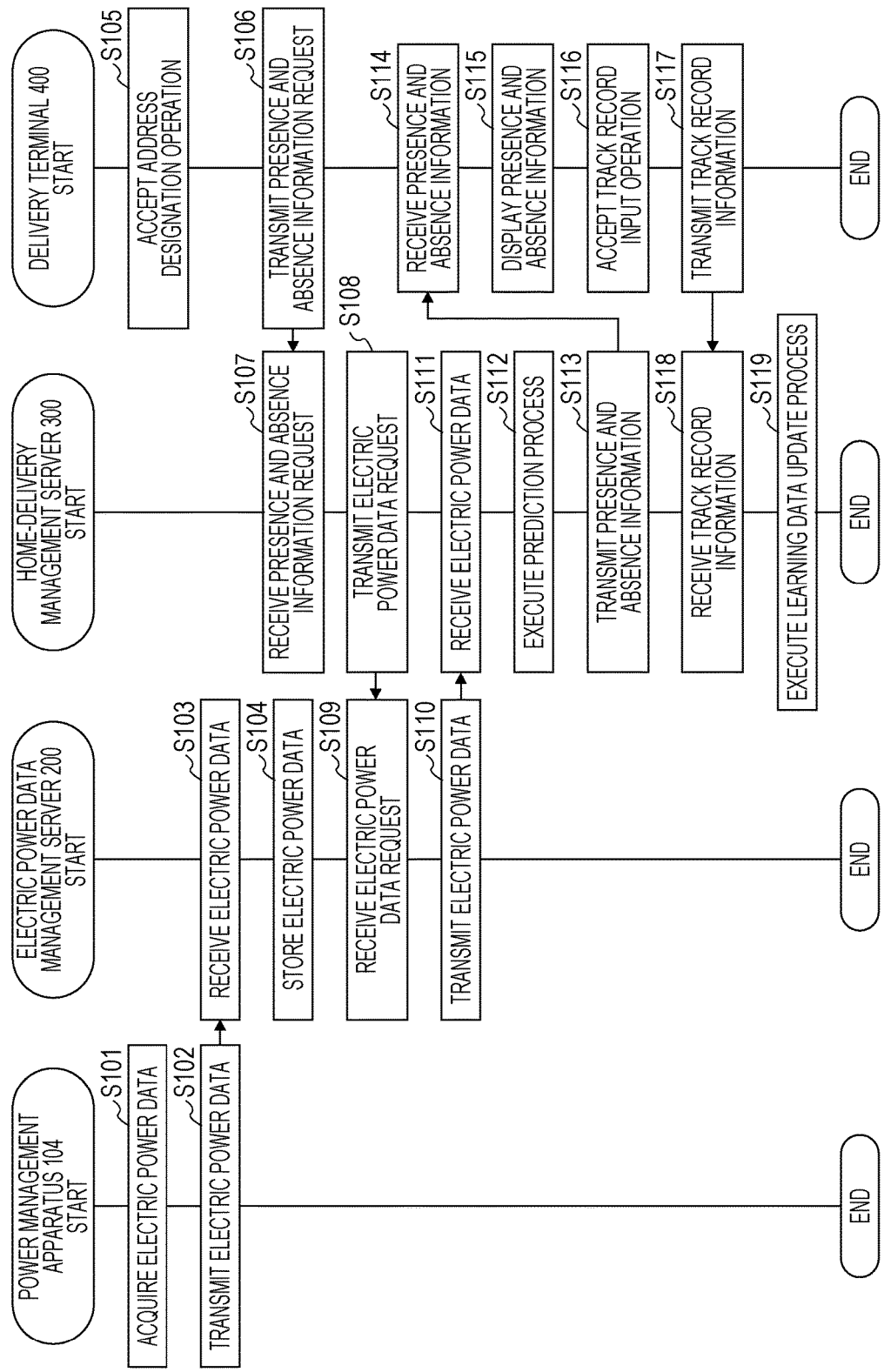
FIG. 2 is a sequence chart showing an example of an operation of the presence and absence prediction system according to Embodiment 1 of the present disclosure.

Next, an operation of the presence and absence prediction system according to Embodiment 1 of the present disclosure is described with reference to FIG. 2. FIG. 2 is a sequence chart showing an example of the operation of the presence and absence prediction system according to Embodiment 1.

First, the power management apparatus 104 acquires electric power data of each branch circuit from the power distribution board 103 every predetermined period of time (step S101). Then, the power management apparatus 104 summates the electric power data thus acquired.

Next, the power management apparatus 104 associates acquisition time information, building identification information, and the electric power data thus summated with one another and transmits these pieces of information and data to the electric power data management server 200 via the predetermined network (step S102). The acquisition time information is information that indicates the point in time where the electric power data was acquired. The building identification information is information that enables the building 100 to be identified.

Next, the communicator 201 of the electric power data management server 200 receives the building identification information, the acquisition time information, and the electric power data, which were transmitted from the power management apparatus 104 (step S103).

Next, the controller 203 of the electric power data management server 200 associates the building identification information, the acquisition time information, and the electric power data, which were received by the communicator 201, with one another, and stores these pieces of information and data in the storage 202 (step S104).

The process in steps S101 to S104 described above is repeatedly performed.

Let it be assumed here that an employee of the home-delivery company has performed an address designation operation at the delivery terminal 400 before performing delivery to the building 100. As described above, the address designation operation is an operation of designating the address of a building 100 that the employee of the home-delivery company is going to visit.

The inputter 404 of the delivery terminal 400 accepts the address designation operation (step S105).

Next, the controller 403 of the delivery terminal 400 reads out, from the storage 402, building identification information associated with the address designated by the address designation operation. It should be noted that, as described above, in the storage 402, address information indicating the address of a building 100 is stored in a linked manner for each piece of building identification information.

Then, the controller 403 controls the communicator 401 to transmit a presence and absence information request containing the building identification information thus read out and current time information to the home-delivery management server 300. This allows the communicator 401 to transmit the presence and absence information request to the home-delivery management server 300 via the predetermined network (step S106). It should be noted that, as described above, the current time information is for example information that indicates the point in time where the delivery terminal 400 (inputter 404) accepted the address designation operation performed by the employee of the home-delivery company.

Next, the communicator 301 of the home-delivery management server 300 receives the presence and absence information request transmitted from the delivery terminal 400 (step S107).

Next, the controller 303 of the home-delivery management server 300 extracts the building identification information and the current time information from the presence and absence information request received by the communicator 301, and controls the communicator 301 to transmit an electric power data request containing the building identification information and current time information thus extracted to the electric power data management server 200. This allows the communicator 301 to transmit the electric power data request to the electric power data management server 200 via the predetermined network (step S108).

Next, the communicator 201 of the electric power data management server 200 receives the electric power data request transmitted from the home-delivery management server 300 (step S109).

Next, the controller 203 of the electric power data management server 200 extracts the building identification information and the current time information from the electric power data request received by the communicator 201, and searches the storage 202 for building identification information and acquisition time information that correspond to the building identification information and current time information thus extracted. Then, the controller 203 reads out, from the storage 202, electric power data with which the building identification information and acquisition time information thus found are associated. Then, the controller 203 controls the communicator 201 to transmit the electric power data thus read out to the home-delivery management server 300. This allows the communicator 201 to transmit the electric power data to the home-delivery management server 300 via the predetermined network (step S110).

Next, the communicator 301 of the home-delivery management server 300 receives the electric power data transmitted from the electric power data management server 200 (step S111).

Next, the controller 303 of the home-delivery management server 300 executes a prediction process for predicting, on the basis of the learning data stored in the storage 302 and the electric power data received by the communicator 301, whether a person (e.g., a resident) is present in the building 100 (step S112). By the execution of this prediction process, presence and absence information that indicates a result of the prediction is generated. Details of the prediction process will be described later with reference to FIGS. 3 and 4.

Next, the controller 303 controls the communicator 301 to transmit the presence and absence information thus generated to the delivery terminal 400. This allows the communicator 301 to transmit the presence and absence information to the delivery terminal 400 via the predetermined network (step S113).

Next, the communicator 401 of the delivery terminal 400 receives the presence and absence information transmitted from the home-delivery management server 300 (step S114).

Next, the controller 403 of the delivery terminal 400 controls the outputter 405 to display the presence and absence information received by the communicator 401. This allows the outputter 405 to display the presence and absence information (step S115). This display allows the employee of the home-delivery company to grasp the result of the prediction as to whether the person is present in the building 100.

Let it be assumed then that the employee of the home-delivery company, who actually visited the building 100, has performed a track record input operation at the delivery terminal 400. As described above, the track record input operation is an operation in which the employee of the home-delivery company inputs address information of a building 100 that the employee of the home-delivery company actually visited, visit time information that indicates the point in time where the employee of the home-delivery company visited the building 100, and visit result information that indicates whether a person was actually present in the building 100 when the employee of the home-delivery company visited the building 100.

The inputter 404 of the delivery terminal 400 accepts the track record input operation (step S116).

Next, the controller 403 of the delivery terminal 400 reads out, from the storage 402, building identification information associated with the address inputted by the track record input operation.

Then, the controller 403 controls the communicator 401 to transmit, to the home-delivery management server 300, track record information containing the building identification information thus read out and the visit time information and visit result information thus inputted. This allows the communicator 401 to transmit the track record information to the home-delivery management server 300 via the predetermined network (step S117).

Next, the home-delivery management server 300 receives the track record information transmitted from the delivery terminal 400 (step S118).

Next, the controller 303 of the home-delivery management server 300 executes a learning data update process on the basis of the track record information received by the communicator 301 (step S119). Details of this learning data update process will be described later.

<Specific Example of Prediction Process>

Figure 3:
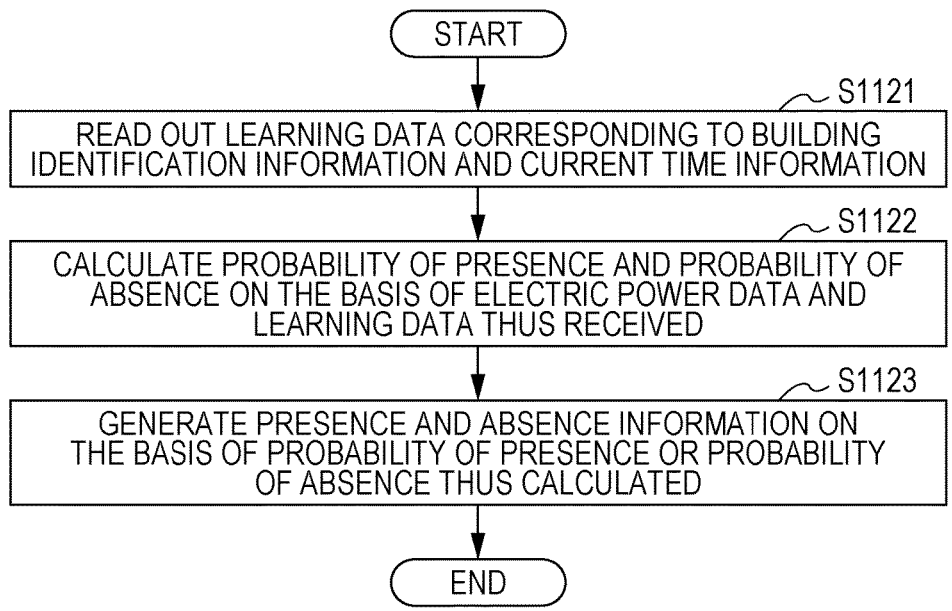
FIG. 3 is a flow chart showing an example of the flow of a prediction process according to Embodiment 1 of the present disclosure.
Figure 4:
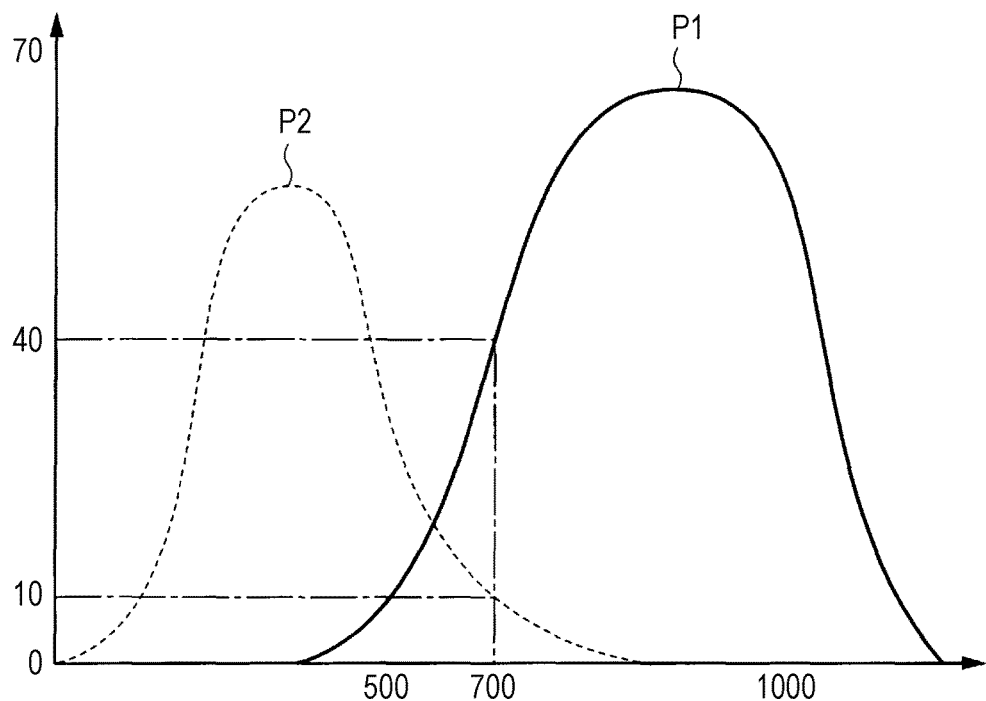
FIG. 4 is a diagram showing an example of learning data according to Embodiment 1 of the present disclosure.

Next, the flow of the prediction process (step S112 shown in FIG. 2) is described with reference to FIGS. 3 and 4. FIG. 3 is a flow chart showing an example of the flow of the prediction process. FIG. 4 is a diagram showing an example of learning data.

First, the controller 303 of the home-delivery management server 300 extracts the building identification information and the current time information from the presence and absence information received request by the communicator 301, and reads out, from the storage 302, learning data corresponding to the building identification information and current time information thus extracted (step S1121).

In the following, a specific process in step S1121 is described.

As described above, learning data is stored in the storage 302 for each piece of building identification information. Further, learning data corresponding to one piece of building identification information is present for each predetermined time period (e.g., 30 minutes, 1 hour, or the like). For example, in a case where the predetermined time period is in a 30 minutes unit, plural pieces of learning data are present in correspondence with time periods in a day such as a time period from 9:00 a.m. to 9:30 a.m., a time period from 9:30 a.m. to 10:00 a.m., and a time period from 10:00 a.m. to 10:30 a.m.

The controller 303 first searches for plural pieces of learning data to which the building identification information thus extracted is linked, and then reads out, from among the plural pieces of learning data thus found, learning data corresponding to a time period including the point in time indicated by the current time information thus extracted. For example, in a case where the point in time indicated by the current time information is 9:15 a.m., the controller 303 reads out, from the storage 302, learning data corresponding to the time period from 9:00 a.m. to 9:30 a.m.

An example of learning data is described here with reference to FIG. 4. FIG. 4 is a diagram showing an example of learning data. The learning data shown in FIG. 4 is for example learning data corresponding to the time period from 9:00 a.m. to 9:30 a.m.

In FIG. 4, the vertical axis represents a total value (hereinafter referred to as "first total value") of the number of times the person was actually present in the building 100 and a total value (hereinafter referred to as "second total value") of the number of times the person was not actually present in the building 100, and the horizontal axis represents a value of electric power data (e.g., an amount of power consumption. The unit is wh) in the building 100.

Further, in FIG. 4, the curve P1 is a curve that represents the first total value for each amount of power consumption, and the curve P2 is a curve that represents the second total value for each amount of power consumption. For example, the curve P1 indicates that there were forty occasions on which the person was actually present in the building 100 when the amount of power consumption was 700 wh during the time period from 9:00 a.m. to 9:30 a.m. in the past. Further, the curve P2 indicates that there were ten occasions on which the person was not actually present in the building 100 when the amount of power consumption was 700 wh during the time period from 9:00 a.m. to 9:30 a.m. in the past.

In the foregoing, a specific process in step S1121 and an example of learning data have been described. The following returns to the description of the flow chart of FIG. 3.

Next, the controller 303 calculates the probability of presence and the probability of absence on the basis of the electric power data that the communicator 301 received as a response to the electric power data request and the learning data read out from the storage 302 (step S1122).

In the following, a specific process in step S1122 is described.

For example, let it be assumed that the electric power data received by the communicator 301 has a value of 700 wh and the learning data read out from the storage 302 is the learning data shown in FIG. 4. In this case, the controller 303 specifies the first total value "40" and the second total value "10" from the value of electric power data "700", the curve P1, and the curve P2.

Then, the controller 303 calculates the ratio of the first total value "40" to a total "50" of the first total value and the second total value. A result of this calculation is the probability of presence. In the above case, the probability of presence is for example 40/50×100=80%.

Similarly, the controller 303 calculates the ratio of the second total value "10" to the total "50" of the first total value and the second total value. A result of this calculation is the probability of absence. In the above case, the probability of absence is for example 10/50×100=20%.

In the foregoing, a specific process in step S1122 has been described.

The following returns to the description of the flow chart of FIG. 3.

Next, the controller 303 generates presence and absence information on the basis of the probability of presence or the probability of absence thus calculated (step S1123). For example, in a case where an 80% probability of presence and a 20% probability of absence have been calculated, the controller 303 generates presence and absence information that indicates the 80% probability of presence, which is larger in numerical value. When the presence and absence information thus generated is displayed by the outputter 405 of the delivery terminal 400, the employee of the home-delivery company can grasp that the probability of presence of the person in the building 100 is 80%.

In the foregoing, an example of the flow of the prediction process has been described.

It should be noted that although the foregoing description assumes that, in steps S1122 to S1123, the controller 303 calculates both the probability of presence and the probability of absence and generates presence and absence information through selecting the probability that is larger in value, this does not imply any limitation. For example, the controller 303 may calculate either the probability of presence or the probability of absence and generate presence and absence information that indicates either the probability of presence or the probability of absence thus calculated.

<Specific Example of Learning Data Update Process>

Figure 5:
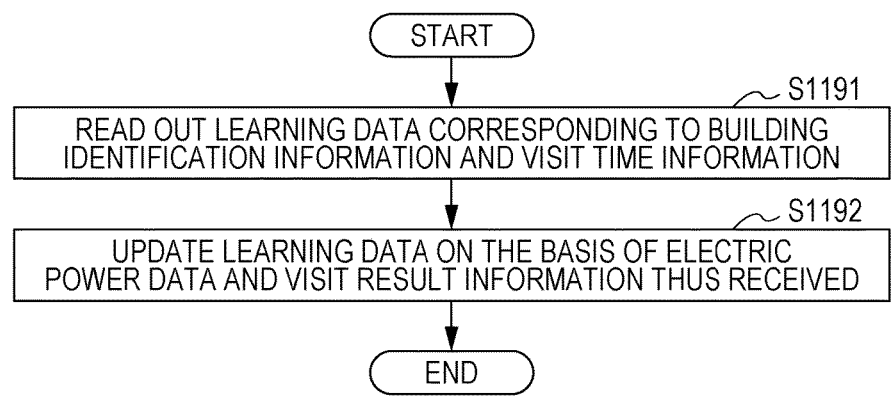
FIG. 5 is a flow chart showing an example of the flow of a learning data update process according to Embodiment 1 of the present disclosure.

Next, the flow of the learning data update process (step S119 shown in FIG. 2) is described with reference to FIG. 5. FIG. 5 is a flow chart showing an example of the flow of the learning data update process.

First, the controller 303 of the home-delivery management server 300 extracts the building identification information, the visit time information, and the visit result information from the track record information received by the communicator 301, and reads out, from the storage 302, learning data corresponding to the building identification information and visit time information thus extracted (step S1191).

For example, let it be assumed that plural pieces of learning data corresponding to predetermined period of time in 30 minutes units are present in the storage 302 for each piece of building identification information. In this case, the controller 303 first searches for plural pieces of learning data to which the building identification information thus extracted is linked, and then reads out, from among the plural pieces of learning data thus found, learning data corresponding to a time period including the point in time indicated by the visit time information thus extracted. For example, in a case where the point in time indicated by the visit time information is 9:25 a.m., the controller 303 reads out, from the storage 302, learning data corresponding to the time period from 9:00 a.m. to 9:30 a.m.

Next, on the basis of the electric power data that the communicator 301 received as a response to the electric power data and the visit result information extracted from the track record information, the controller 303 updates the learning data read out from the storage 302 (step S1192).

For example, let it be assumed that the electric power data received by the communicator 301 has a value of 700 wh and the learning data read out from the storage 302 is the learning data shown in FIG. 4. Then, for example, in a case where the visit result information indicates "presence (occasion on which the person was actually present in the building 100)", the controller 303 changes the first total value corresponding to "700 wh" from "40" to "41" in the learning data shown in FIG. 4, and updates the curve P1 so that the curve P1 passes through the coordinates (700, 41) thus changed. Alternatively, for example, in a case where the visit result information indicates "absence (occasion on which the person was not actually present in the building 100)", the controller 303 changes the first total value corresponding to "700 wh" from "10" to "11" in the learning data shown in FIG. 4, and updates the curve P2 so that the curve P2 passes through the coordinates (700, 11) thus changed.

In the foregoing, an example of the flow of the learning data update process has been described.

It should be noted that although the foregoing description assumes that, in step S1192, the controller 303 uses electric power data that the communicator 301 received as a response to an electric power data request, this does not imply any limitation. For example, in a case where the communicator 301 has received track record information, the controller 303 may control the communicator 301 to transmit, to the electric power data management server 200, an electric power data request containing the building identification information and visit time information extracted from the track record information. In this case, after having transmitted the electric power data request, the communicator 301 receives electric power data corresponding to the visit time information from the electric power data management server 200 as a response to the electric power data request. Then, the controller 303 uses the electric power data corresponding to the visit time information to update the learning data as described above.

Further, the creation of learning data, too, is performed by the learning data update process described above. In that case, the learning data update process described above may be performed on learning data prepared in advance (e.g., learning data whose curves P1 and P2 were calculated on the basis of electric power data and visit result information that were acquired from a large number of households). Alternatively, for example, the learning data prepared in advance may be learning data whose curves P1 and P2 were calculated on the basis of electric power data and visit result information that were acquired from households that are similar in family composition (e.g., the number of persons, age, sex, residential area, and the like).

Thus, Embodiment 1 predicts the presence or absence of a person in a predetermined building on the basis of learning data obtained by learning a correspondence relationship between past electric power data in the predetermined building and information indicating whether a person was actually present in the predetermined building and electric power data at the current time (i.e., the point in time where an employee of the home-delivery company has requested presence and absence information to be displayed). Therefore, Embodiment 1 can achieve highly accurate presence and absence prediction based on electric power data.

Embodiment 2

Embodiment 2 of the present disclosure is described.
<Configuration of Presence and Absence Prediction System>

Figure 6:
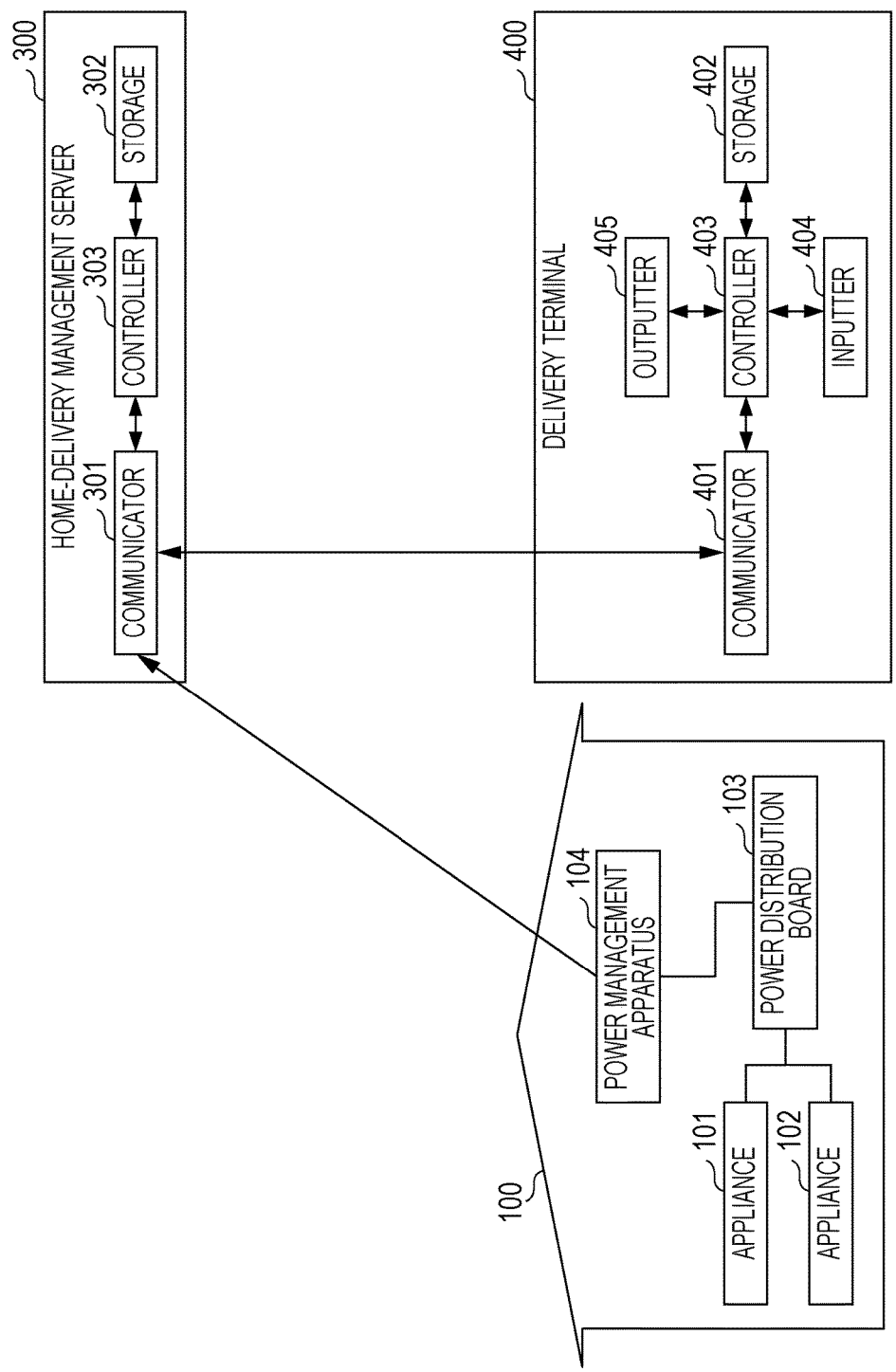
FIG. 6 is a block diagram showing an example of a configuration of a presence and absence prediction system according to Embodiment 2 of the present disclosure.

First, a configuration of a presence and absence prediction system according to Embodiment 2 of the present disclosure is described with reference to FIG. 6. FIG. 6 is a block diagram showing an example of the configuration of the presence and absence prediction system according to Embodiment 2.

As shown in FIG. 6, the presence and absence prediction system according to Embodiment 2 differs from the configuration of FIG. 1 described in Embodiment 1 in that it does not include the electric power data management server 200. In Embodiment 2, the home-delivery management server 300 performs communication with the power management apparatus 104 and acquires electric power data from the power management apparatus 104.

<Operation of Presence and Absence Prediction System>

Figure 7:
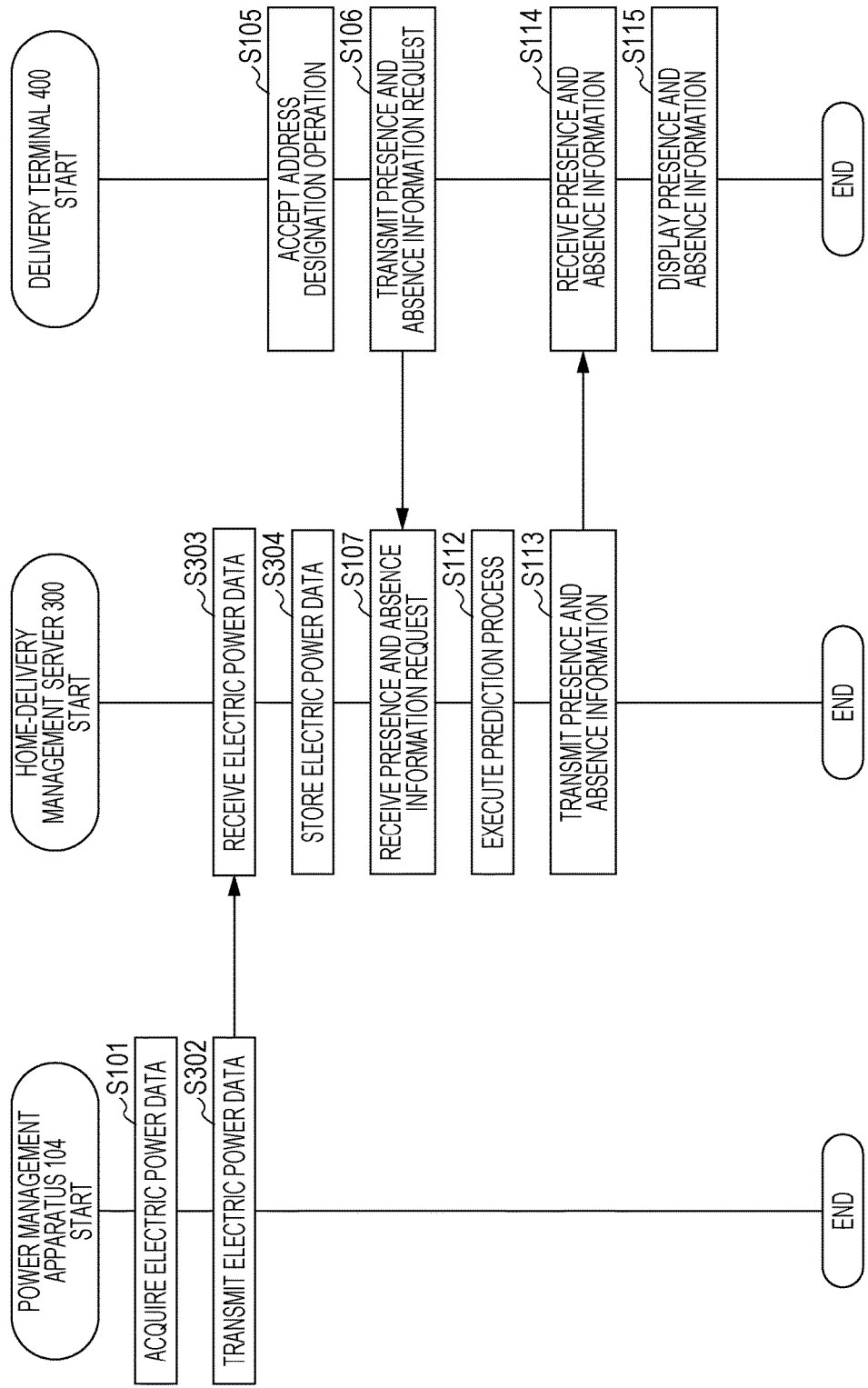
FIG. 7 is a sequence chart showing an example of an operation of the presence and absence prediction system according to Embodiment 2 of the present disclosure.

Next, an operation of the presence and absence prediction system according to Embodiment 2 of the present disclosure is described with reference to FIG. 7. FIG. 7 is a sequence chart showing an example of the operation of the presence and absence prediction system according to Embodiment 2. The following deals with points of difference from FIG. 2.

After having acquired and summated electric power data in step S101, the power management apparatus 104 associates acquisition time information, building identification information, and the electric power data thus summated with one another and transmits these pieces of information and data to the home-delivery management server 300 via the predetermined network (step S302). The acquisition time information is information that indicates the point in time where the electric power data was acquired. The building identification information is information that enables the building 100 to be identified.

Next, the communicator 301 of the home-delivery management server 300 receives the building identification information, the acquisition time information, and the electric power data, which were transmitted from the power management apparatus 104 (step S303).

Next, the controller 303 of the home-delivery management server 300 associates the building identification information, the acquisition time information, and the electric power data, which were received by the communicator 301, with one another, and stores these pieces of information and data in the storage 302 (step S304).

The process in steps S101 and S302 to S304 described above is repeatedly performed.

When, in step S107, the communicator 301 receives the presence and absence information request from the delivery terminal 400, the controller 303 extracts the building identification information and the current time information from the presence and absence information request, and searches the storage 302 for building identification information and acquisition time information that correspond to the building identification information and current time information thus extracted. Then, the controller 303 reads out, from the storage 302, electric power data with which the building identification information and acquisition time information thus found are associated, and executes a prediction process (step S112). This prediction process is basically the same as that shown in FIG. 3, but differs in that the electric power data read out from the storage 302 is used in step S1122.

It should be noted that FIG. 7 omits to illustrate steps S116 to S119 shown in FIG. 2; however, in Embodiment 2, too, the process in steps S116 to S119 shown in FIG. 2 is performed after the display of the presence and absence information (step S115).

Thus, as with Embodiment 1, Embodiment 2 can achieve highly accurate presence and absence prediction based on electric power data. Further, Embodiment 2 does not need to use the electric power data management server 200, and can therefore cut the operational cost of the electric power data management server 200.

Embodiment 3

Embodiment 3 of the present disclosure is described.
<Configuration of Presence and Absence Prediction System>

Figure 8:
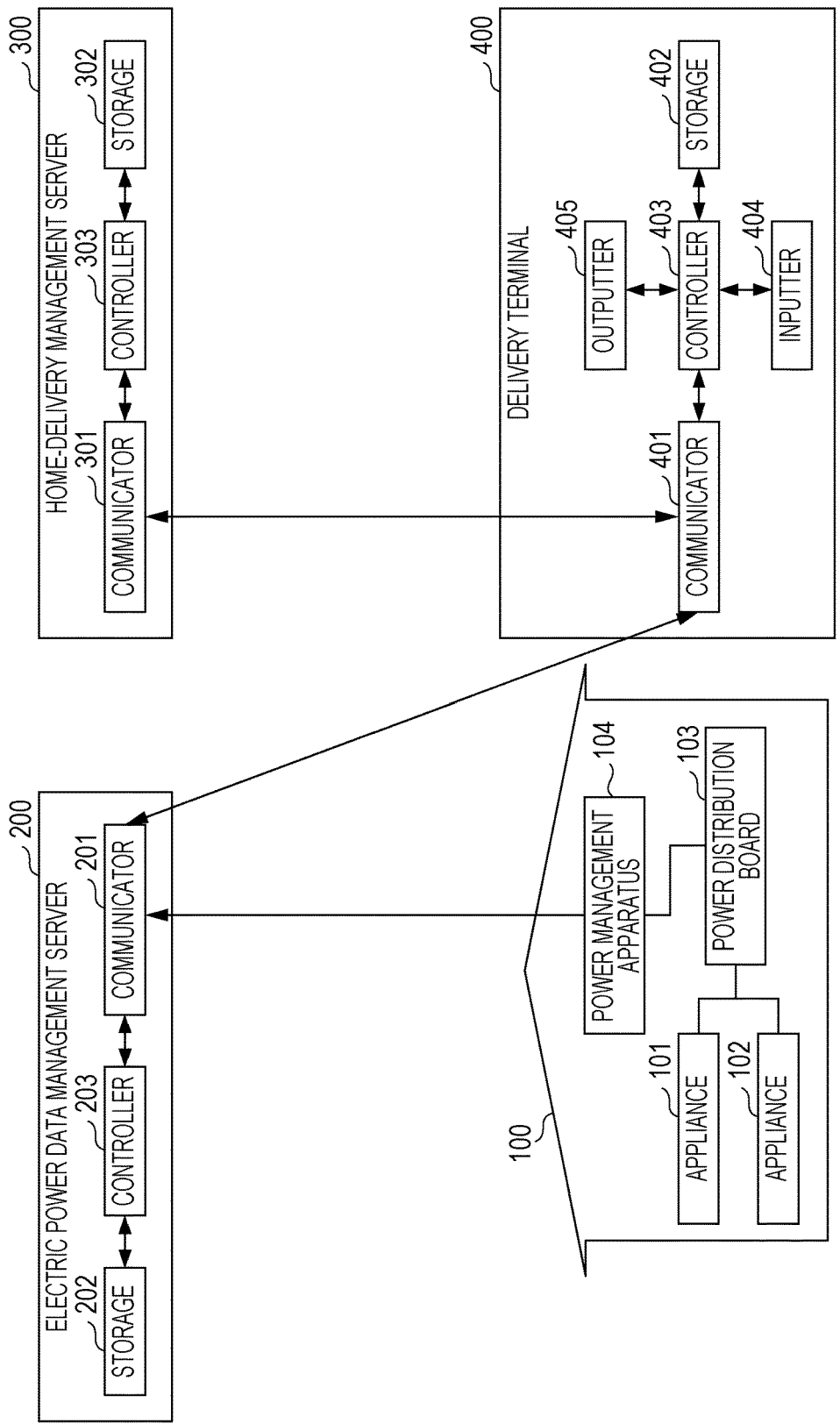
FIG. 8 is a block diagram showing an example of a configuration of a presence and absence prediction system according to Embodiment 3 of the present disclosure.

First, a configuration of a presence and absence prediction system according to Embodiment 3 of the present disclosure is described with reference to FIG. 8. FIG. 8 is a block diagram showing an example of the configuration of the presence and absence prediction system according to Embodiment 3.

As shown in FIG. 8, the presence and absence prediction system according to Embodiment 3 is the same as the configuration of FIG. 1 described in Embodiment 1, but differs in that the delivery terminal 400 performs a prediction process. In Embodiment 3, the delivery terminal 400 performs communication with the electric power data management server 200 and the home-delivery management server 300. Moreover, the delivery terminal 400 performs a prediction process on the basis of electric power data acquired from the electric power data management server 200 and learning data acquired from the home-delivery management server 300. That is, in Embodiment 3, the delivery terminal 400 corresponds to an example of the "presence and absence prediction apparatus", and the controller 403 corresponds to an example of the "predictor".

<Operation of Presence and Absence Prediction System>

Figure 9:
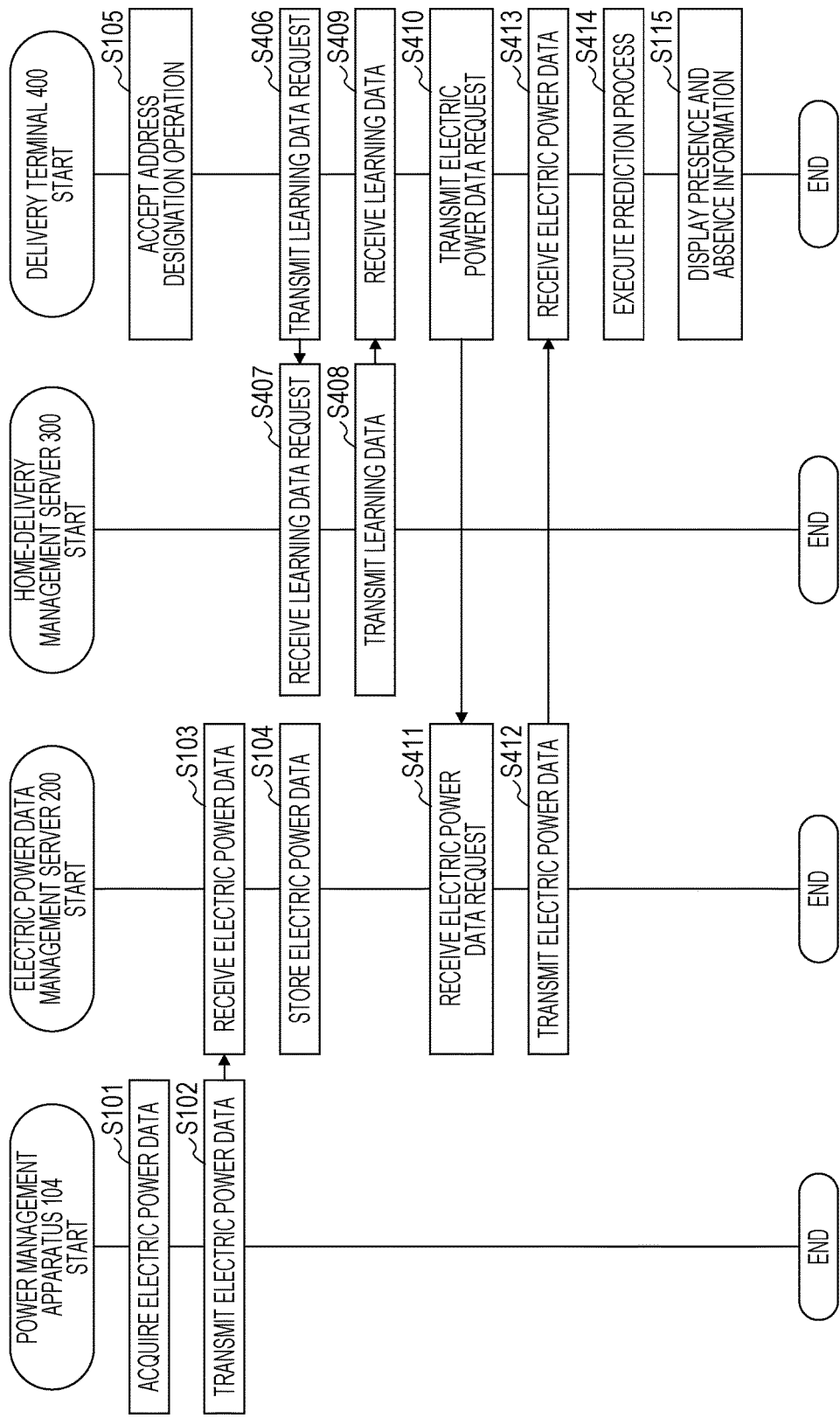
FIG. 9 is a sequence chart showing an example of an operation of the presence and absence prediction system according to Embodiment 3 of the present disclosure.

Next, an operation of the presence and absence prediction system according to Embodiment 3 of the present disclosure is described with reference to FIG. 9. FIG. 9 is a sequence chart showing an example of the operation of the presence and absence prediction system according to Embodiment 3. The following deals with points of difference from FIG. 2.

After, in step S105, the inputter 404 has accepted the address designation operation, the controller 403 controls the communicator 401 to transmit a learning data request containing building identification information read out from the storage 302 and current time information to the home-delivery management server 300. This allows the communicator 401 to transmit the learning data request to the home-delivery management server 300 via the predetermined network (step S406). It should be noted that, as described above, the current time information is for example information that indicates the point in time where the delivery terminal 400 (inputter 404) accepted the address designation operation.

Next, the communicator 301 of the home-delivery management server 300 receives the learning data request transmitted from the delivery terminal 400 (step S407).

Next, the controller 303 of the home-delivery management server 300 extracts the building identification information and the current time information from the learning data request received by the communicator 301, and reads out learning data corresponding to the building identification information and current time information thus extracted. This readout process is the same as step S1121 shown in FIG. 3.

Next, the controller 303 controls the communicator 301 to transmit the learning data thus read out to the delivery terminal 400. This allows the communicator 301 to transmit the learning data to the delivery terminal 400 via the predetermined network (step S408).

Next, the communicator 401 of the delivery terminal 400 receives the learning data transmitted from the home-delivery management server 300 (step S409).

Next, the controller 403 of the delivery terminal 400 controls the communicator 401 to transmit an electric power data request containing the building identification information read out from the storage 302 and the current time information to the electric power data management server 200. This allows the communicator 401 to transmit the electric power data request to the electric power data management server 200 via the predetermined network (step S410).

Next, the communicator 201 of the electric power data management server 200 receives the electric power data request transmitted from the delivery terminal 400 (step S411).

Next, the controller 203 of the electric power data management server 200 extracts the building identification information and the current time information from the electric power data request received by the communicator 201, and searches the storage 202 for building identification information and acquisition time information that correspond to the building identification information and current time information thus extracted. Then, the controller 203 reads out, from the storage 202, electric power data with which the building identification information and acquisition time information thus found are associated. Then, the controller 203 controls the communicator 201 to transmit the electric power data thus read out to the delivery terminal 400. This allows the communicator 201 to transmit the electric power data to the delivery terminal 400 via the predetermined network (step S412).

Next, the communicator 401 of the delivery terminal 400 receives the electric power data transmitted from the electric power data management server 200 (step S413). That is, in Embodiment 3, the communicator 401 corresponds to an example of the "electric power data acquirer".

Next, the controller 403 of the delivery terminal 400 executes a prediction process on the basis of the learning data and electric power data received by the communicator 401 (step S414). This prediction process is basically the same as that shown in FIG. 3, but differs in that step S1121 is not performed and that the learning data and electric power data received by the communicator 401 are used in step S1122.

It should be noted that FIG. 9 omits to illustrate a learning data update process; however, in Embodiment 3, too, the learning data update process described with reference to FIG. 5 is performed at the delivery terminal 400 after the display of the presence and absence information (step S115).

Further, although, in the example shown in FIG. 9, the transmission of an electric power data request (step S410) follows the transmission of a learning data request (step S406), the transmission of a learning data request may follow the transmission of an electric power data request, or the transmission of a learning data request and the transmission of an electric power data request may occur at the same time.

Thus, as with Embodiment 1, Embodiment 3 can achieve highly accurate presence and absence prediction based on electric power data. Further, Embodiment 3, in which the delivery terminal 400 performs a prediction process, can reduce the load of a prediction process on the home-delivery management server 300.

Embodiment 4

Embodiment 4 of the present disclosure is described.

<Configuration of Presence and Absence Prediction System>

Figure 10:
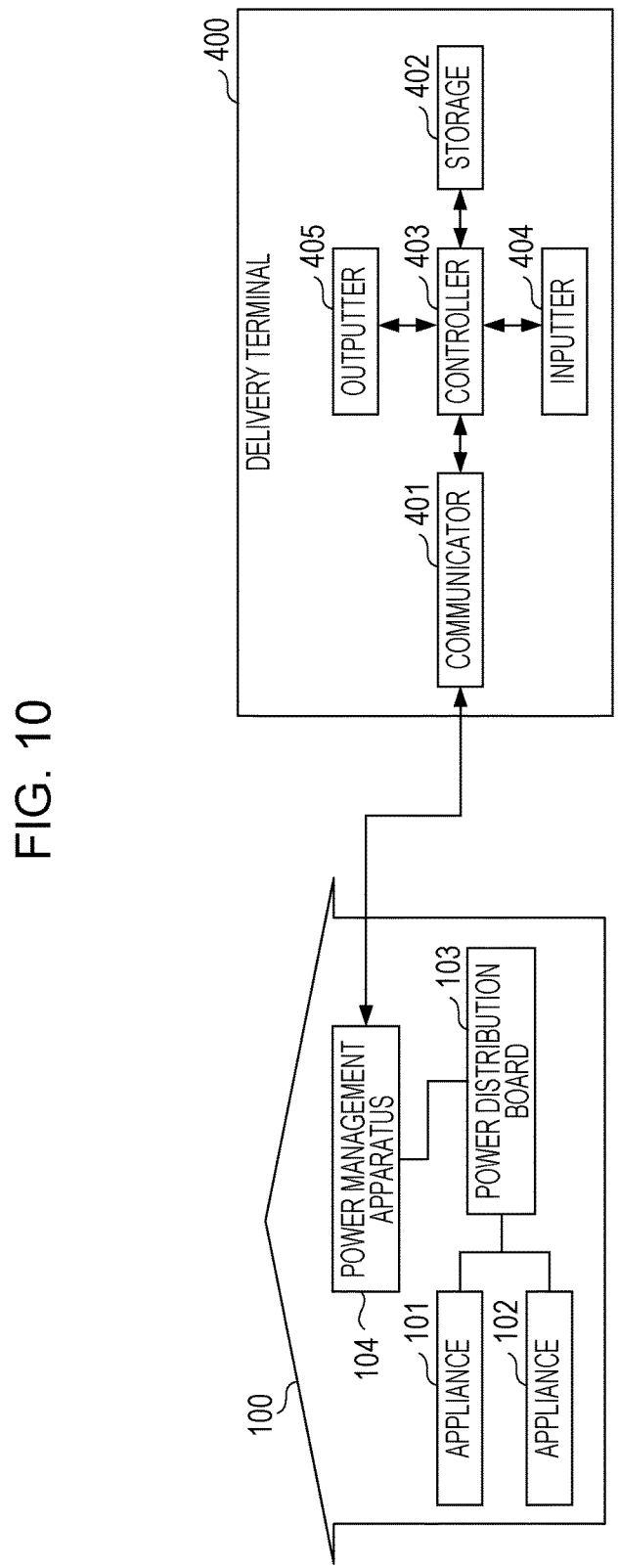
FIG. 10 is a block diagram showing an example of a configuration of a presence and absence prediction system according to Embodiment 4 of the present disclosure.

First, a configuration of a presence and absence prediction system according to Embodiment 4 of the present disclosure is described with reference to FIG. 10. FIG. 10 is a block diagram showing an example of the configuration of the presence and absence prediction system according to Embodiment 4.

As shown in FIG. 10, the presence and absence prediction system according to Embodiment 4 differs from the configuration of FIG. 1 described in Embodiment 1 in that it does not include the electric power data management server 200 and the home-delivery management server 300 and that the delivery terminal 400 performs a prediction process. In Embodiment 4, the delivery terminal 400 performs communication with the power management apparatus 104. Moreover, the delivery terminal 400 performs a prediction process on the basis of electric power data acquired from the power management apparatus 104 and learning data stored in the delivery terminal 400. That is, in Embodiment 4, the delivery terminal 400 corresponds to an example of the "presence and absence prediction apparatus", and the controller 403 corresponds to an example of the "predictor". Let it be assumed that, in Embodiment 4, learning data is stored in the storage 402 of the delivery terminal 400, as in the case of the storage 302 of the home-delivery management server 300 described in Embodiments 1 to 3.

<Operation of Presence and Absence Prediction System>

Figure 11:
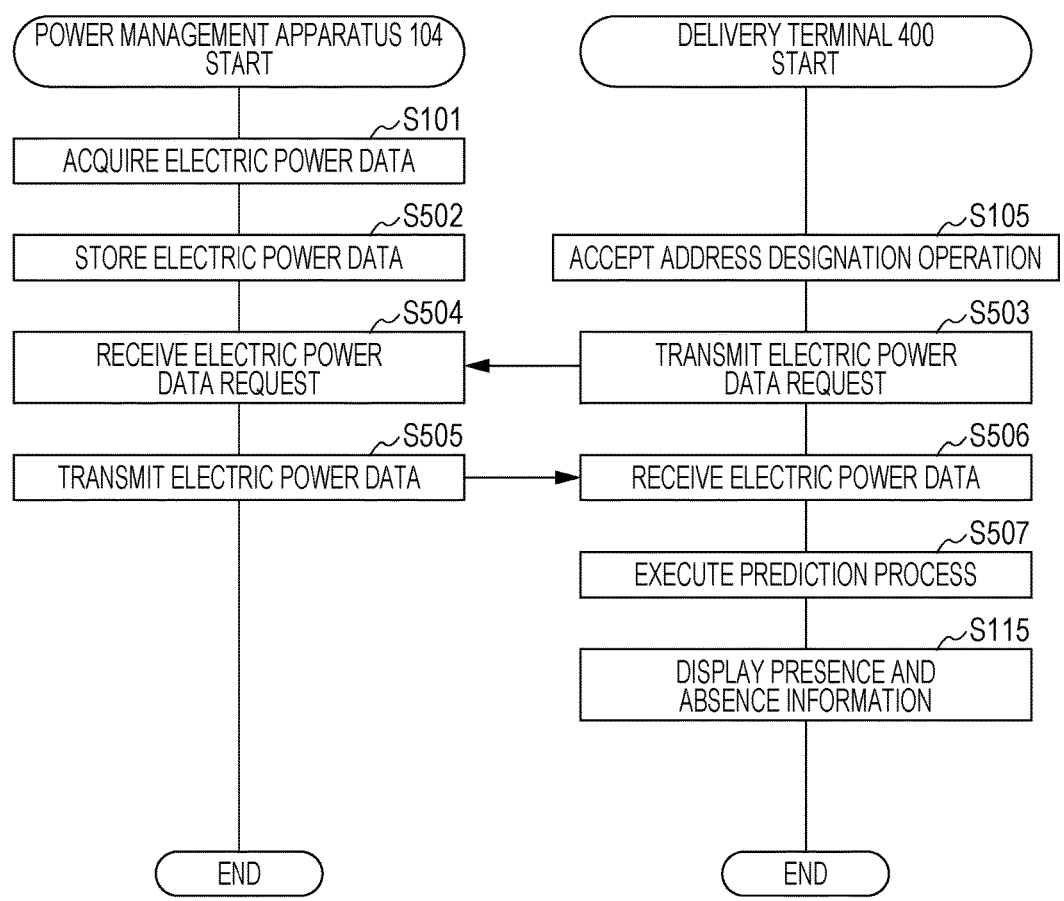
FIG. 11 is a sequence chart showing an example of an operation of the presence and absence prediction system according to Embodiment 4 of the present disclosure.

Next, an operation of the presence and absence prediction system according to Embodiment 4 of the present disclosure is described with reference to FIG. 11. FIG. 11 is a sequence chart showing an example of the operation of the presence and absence prediction system according to Embodiment 4. The following deals with points of difference from FIG. 2.

After having acquired and summated electric power data in step S101, the power management apparatus 104 associates acquisition time information, building identification information, and the electric power data thus summated with one another and transmits these pieces of information and data to a predetermined storage device (not illustrated) (step S502). The acquisition time information is information that indicates the point in time where the electric power data was acquired. The building identification information is information that enables the building 100 to be identified. The predetermined storage device may for example be provided inside of the power management apparatus 104 or outside of the power management apparatus 104.

The process in steps S101 and S502 described above is repeatedly performed.

After, in step S105, the inputter 404 has accepted the address designation operation, the controller 403 controls the communicator 401 to transmit an electric power data request containing building identification information read out from the storage 402 and current time information to the power management apparatus 104. This allows the communicator 401 to transmit the electric power data request to the power management apparatus 104 via the predetermined network (step S503). It should be noted that, as described above, the current time information is for example information that indicates the point in time where the delivery terminal 400 (inputter 404) accepted the address designation operation.

Next, the power management apparatus 104 receives the electric power data request transmitted from the delivery terminal 400 (step S504).

Next, the power management apparatus 104 extracts the building identification information and the current time information from the electric power data request thus received, and searches the predetermined storage device for building identification information and acquisition time information that correspond to the building identification information and current time information thus extracted. Then, the power management apparatus 104 reads out, from the predetermined storage device, electric power data with which the building identification information and acquisition time information thus found are associated. Then, the power management apparatus 104 transmits the electric power data thus read out to the delivery terminal 400 (step S505).

Next, the communicator 401 of the delivery terminal 400 receives the electric power data transmitted from the power management apparatus 104 (step S506). That is, in Embodiment 4, the communicator 401 corresponds to an example of the "electric power data acquirer".

Next, the controller 403 of the delivery terminal 400 reads out learning data corresponding to the building identification information and the current time information from the storage 402. This readout process is the same as step S1121 shown in FIG. 3. Further, the building identification information and the current time information that are used in this readout process are the same as the building identification information and the current time information that are contained in the electric power data request transmitted in step S503.

Next, the controller 403 executes a prediction process on the basis of the electric power data received by the communicator 401 and the learning data read out from the storage 402 (step S507). This prediction process is basically the same as that shown in FIG. 3, but differs in that step S1121 is not performed and that the electric power data received by the communicator 401 and the learning data read out from the storage 402 are used in step S1122.

It should be noted that FIG. 11 omits to illustrate a learning data update process; however, in Embodiment 4, too, the learning data update process described with reference to FIG. 5 is performed at the delivery terminal 400 after the display of the presence and absence information (step S115).

Further, although, in the example shown in FIG. 11, the transmission of an electric power data request (step S410) follows the transmission of a learning data request (step S406), the transmission of a learning data request may follow the transmission of an electric power data request, or the transmission of a learning data request and the transmission of an electric power data request may occur at the same time.

Thus, as with Embodiment 1, Embodiment 4 can achieve highly accurate presence and absence prediction based on electric power data. Further, Embodiment 4 does not need to include the electric power data management server 200 and the home-delivery management server 300, and can therefore cut the operational cost of the electric power data management server 200 and the home-delivery management server 300.

While embodiments of the present disclosure have been described, the present disclosure may be modified in various ways unless that such modifications depart from the spirit of the present disclosure. In the following, modifications of the embodiments are described.

<Modification 1>

Each of the embodiments described above has been described by taking, as an example, a case where visit result information inputted by an track record input operation of an employee of the home-delivery company in a learning data update process (see FIG. 5) is used, but is not limited to this example.

Figure 12:
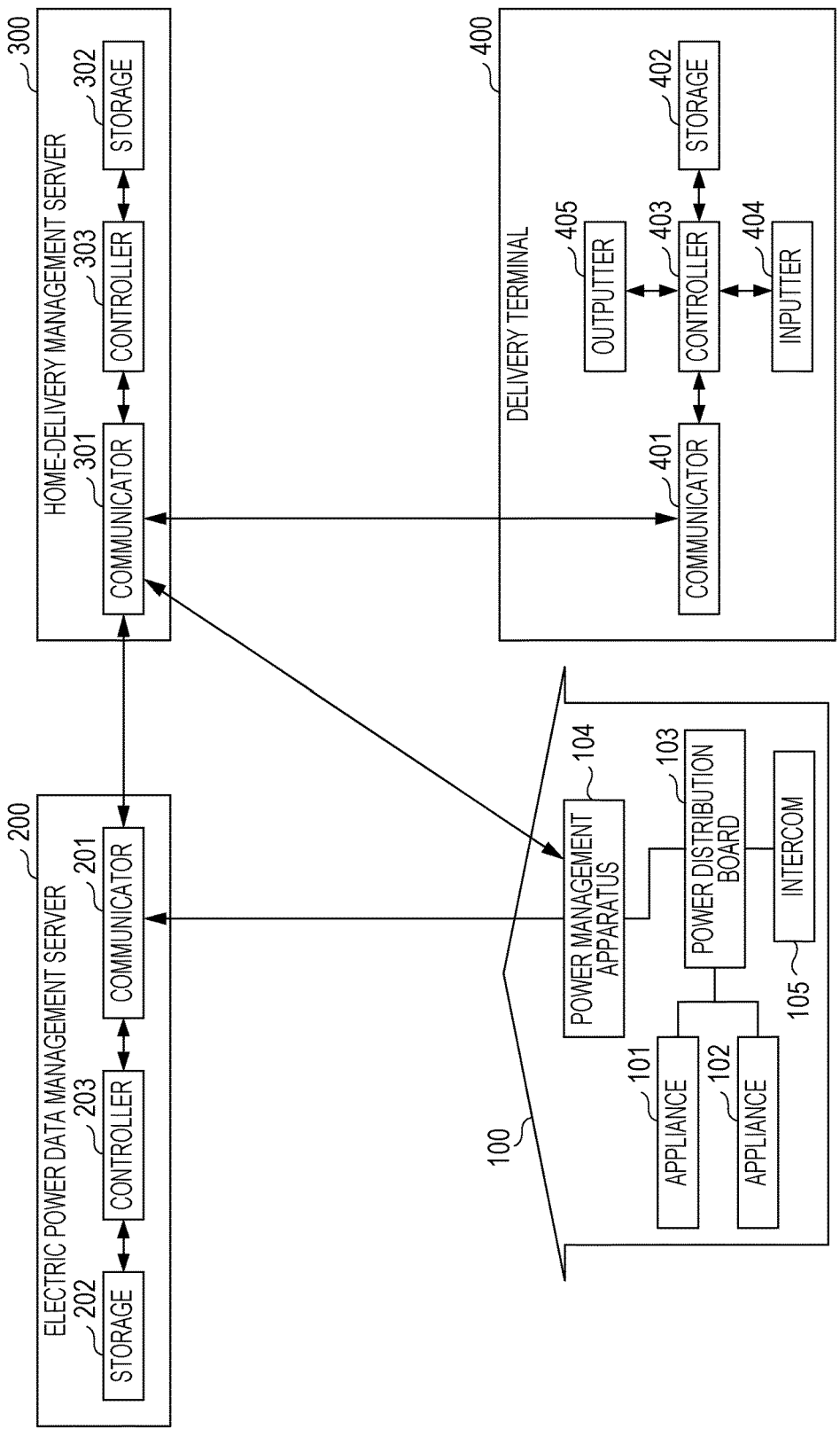
FIG. 12 is a block diagram showing an example of a configuration of a presence and absence prediction system according to a modification of the present disclosure.

For example, it is alternatively possible to determine, on the basis of operation information regarding an operation on a predetermined appliance installed in the building 100, whether the person was actually in the building 100 and to perform a learning data update process using a result of the determination. This specific example is described below with reference to FIG. 12. FIG. 12 is a block diagram showing an example of a configuration of a presence and absence prediction system according to Modification 1.

The configuration shown in FIG. 12 differs from the configuration of FIG. 1 described in Embodiment 1 in that an intercom 105 is installed in the building 100. In FIG. 12, the intercom 105 is electrically connected to the power distribution board 103.

The following describes an example of an operation of the presence and absence prediction system shown in FIG. 12.

First, in a case where the intercom 105 has accepted an operation (hereinafter referred to as "response operation") of responding to a call from a visitor, the intercom 105 outputs operation information to the power management apparatus 104 via the power distribution board 103 to the effect that the response operation has been performed. On the other hand, in a case where the intercom 105 has accepted no response operation within a predetermined period of time (e.g., 30 seconds or the like) after a call from a visitor, the intercom 105 outputs operation information to the power management apparatus 104 via the power distribution board 103 to the effect that no response operation has been performed. It should be noted that the operation information may be outputted directly from the intercom 105 to the power management apparatus 104.

Next, upon acquiring the operation information outputted from the intercom 105, the power management apparatus 104 transmits the operation information, operation information acquisition time information, and building identification information to the home-delivery management server 300. The operation information acquisition time information is information that indicates the point in time where the operation information was acquired. The building identification information is information that enables the building 100 to be identified. It should be noted that the power management apparatus 104 may transmit the operation information and the like to the electric power data management server 200, and the electric power data management server 200 may transmit the operation information and the like to the home-delivery management server 300.

Next, when the communicator 301 receives the building identification information and the operation information acquisition time information, the controller 303 of the home-delivery management server 300 controls the communicator 301 to transmit an electric power data request containing these pieces of information to the electric power data management server 200. This allows the electric power data request to be transmitted from the communicator 301 to the electric power data management server 200 via the predetermined network.

Next, the controller 203 of the electric power data management server 200 searches the storage 202 for building identification information and acquisition time information that correspond to the building identification information and operation information acquisition time information received by the communicator 201, and reads out, from the storage 202, electric power data associated with the building identification information and acquisition time information thus found. Then, the controller 203 controls the communicator 201 to transmit the electric power data thus read out to the home-delivery management server 300. This allows the electric power data to be transmitted from the communicator 201 to the home-delivery management server 300 via the predetermined network.

Next, the communicator 301 of the home-delivery management server 300 receives the electric power data transmitted from the electric power data management server 200.

Next, the controller 303 of the home-delivery management server 300 determines, on the basis of the operation information received by the communicator 301, whether the person was actually present in the building 100. For example, in a case where the operation information indicates that the response operation was performed, the controller 303 determines that the person was actually present in the building 100. On the other hand, in a case where the operation information indicates that no response operation was performed, the controller 303 determines that the person was not actually present in the building 100.

Next, on the basis of a result of the determination and the electric power data received by the communicator 301, the controller 303 updates learning data stored in the storage 302. This learning data update process is basically the same as that shown in FIG. 5, but differs in that the result of the determination is used instead of visit result information.

Thus, Modification 1 makes it possible to perform a learning data update process without resorting to a track record input operation of an employee of the home-delivery company, thus saving an employee of the home-delivery company the trouble of performing a track record input operation.

It should be noted that although the foregoing description takes the intercom 105 as an example, this does not imply any limitation and the intercom 105 may be replaced by another electrical appliance. For example, in the case of operation information outputted from a security system, a determination process is performed as follows: In a case where the operation information indicates that an operation of setting a monitoring mode of monitoring the building 100 during absence has been performed, the controller 303 of the home-delivery management server 300 determines that the person was not actually present in the building 100; on the other hand, in a case where the operation information indicates an operation of canceling the monitoring mode, the controller 303 determines that the person was actually present in the building 100.

Further, although the foregoing description takes, as an example, a case where the home-delivery management server 300 performs a determination process based on operation information (e.g., the cases of Embodiments 1 and 2), the delivery terminal 400 may alternatively acquire the operation information and the like from the power management apparatus 104 and perform the determination process (e.g., the cases of Embodiments 3 and 4). That is, the learning data update process based on the result of the determination process described in Modification 1 is applicable to any of Embodiments 1 to 4.

<Modification 2>

It is alternatively possible to assign a predetermined weight to a prediction result (e.g., the probability of presence or the probability of absence) described in each of the embodiments described above. This specific example is described below.

The home-delivery management server 300 acquires (receives), from the electric power data management server 200, electric power data at the point in time indicated by the current time information and plural pieces of electric power during a predetermined period of time based on the point in time.

For example, in a case where the point in time indicated by the current time information is 9:10 a.m., the home-delivery management server 300 acquires electric power data at 9:10 a.m. and plural pieces of electric power data during a period from 9:05 a.m. to 9:09 a.m. (a period of 5 minutes preceding 9:10 a.m.). It should be noted here that, instead of acquiring plural pieces of electric power data during a predetermined period of time preceding the point in time indicated by the current time information, it is possible to acquire plural pieces of electric power data during a predetermined period of time following the point in time indicated by the current time information or plural pieces of electric power data during a predetermined period of time around the point in time indicated by the current time information.

Then, after having performed a prediction process based on learning data, the controller 303 of the home-delivery management server 300 determines whether there is a change that is equal to or greater than a threshold in the plural pieces of electric power data thus acquired and, according to the change, assigns a weight to a prediction result calculated on the basis of the learning data.

For example, in a case where the difference between the value of electric power data (e.g., the amount of power consumption) at 9:09 a.m. and the value of electric power data (e.g., the amount of power consumption) at 9:07 a.m. is a positive value that is equal to or greater than a threshold, a predetermined number (e.g., 5%, 10%, or the like) is added to the probability of presence calculated on the basis of the learning data in the prediction process.

On the other hand, for example, in a case where the difference between the value of electric power data (e.g., the amount of power consumption) at 9:09 a.m. and the value of electric power data (e.g., the amount of power consumption) at 9:07 a.m. is a negative value that is equal to or greater than a threshold, a predetermined number (e.g., 5%, 10%, or the like) is added to the probability of absence calculated on the basis of the learning data in the prediction process.

It should be noted that even in a case where the difference between the value of electric power data at 9:09 a.m. and the value of electric power data at 9:07 a.m. is a negative value that is equal to or greater than a threshold, a predetermined number may be added to the probability of presence. This is because even in a case where there is a change (decrease) in electric power data, a situation is conceivable in which the person is highly likely to be present. For example, in a case where a microwave oven or the like is used, the person is highly likely to be present after use. Therefore, in such a case, as described above, it is preferable that a predetermined number be uniformly added to the probability of presence, provided the change is equal to or greater than the threshold.

Further, in a case where an appliance can be identified and the difference between the values of two pieces of electric power data is equal to or greater than a threshold, it is possible to choose, according to the appliance, whether to add a predetermined number to the probability of presence or add a predetermined number to the probability of absence.

Thus, Modification 2 can achieve further highly accurate presence and absence prediction based on electric power data by assigning a weight according to a change in plural pieces of electric power data.

Further, although the foregoing description takes, as an example, a case where the home-delivery management server 300 performs a weighting process (e.g., the cases of Embodiments 1 and 2), the delivery terminal 400 may alternatively acquire electric power data at regular intervals and perform the weighting process (e.g., the cases of Embodiments 3 and 4). That is, the weighting process described in Modification 2 is applicable to any of Embodiments 1 to 4.

<Modification 3>

Although Modification 2 has described a weighting process based on plural pieces of electric power data during a predetermined period of time based on a point in time indicated by current time information, the weighting process is not limited to this. Another specific example of a weighting process is described below.

Before executing a prediction process, the home-delivery management server 300 acquires (receives) appliance data indicating an operating appliance. The appliance data may be transmitted from the power management apparatus 104 to the home-delivery management server 300 or transmitted from the appliance 101, the appliance 102, or the like to the home-delivery management server 300.

In the storage 302 of the home-delivery management server 300, determination data indicating predetermined appliances (e.g., a television, a lighting apparatus, a microwave oven, a washing machine, and the like) that are highly frequently used during presence.

The controller 303 of the home-delivery management server 300 reads out the determination data from the storage 302 and determines whether the operating appliance indicated by the appliance data thus acquired is registered in the determination data. In a case where, a result of this determination, the operating appliance s in the determination data, a predetermined number (e.g., 5%, 10%, or the like) is added to the probability of presence calculated on the basis of the learning data in the prediction process.

It should be noted that, in the determination data, different weighting values (e.g., % to be added) may be set for each separate appliance. For example, the weighting value (e.g., 10%) of the television may be set larger than the weighting value (e.g., 5%) of the washing machine, as the television is more likely to be used during presence than the washing machine.

Thus, Modification 3 can achieve further highly accurate presence and absence prediction based on electric power data by performing weighting on the basis of appliance data indicating an operating appliance and determination data.

Further, although the foregoing description takes, as an example, a case where the home-delivery management server 300 performs a weighting process (e.g., the cases of Embodiments 1 and 2), the delivery terminal 400 may alternatively acquire electric power data at regular intervals and perform the weighting process (e.g., the cases of Embodiments 3 and 4). That is, the weighting process described in Modification 3 is applicable to any of Embodiments 1 to 4.

<Modification 4>

The learning data described in each of the embodiments described above has been described by taking, as an example, learning data obtained by learning, for each predetermined time period in a day, a correspondence relationship between electric power data and whether the person was actually present in the building 100, but is not limited to this example. For example, the learning data may be data obtained by learning the correspondence relationship for at least one of elements in addition to the predetermined time period. The elements are the days of the week, the months, the weather, the outside air temperature, the humidity, and the seasons.

Thus, Modification 4 can achieve further highly accurate presence and absence prediction based on electric power data by performing a prediction process on the basis of learning data segmentalized for each separate one of the elements.

<Modification 5>

In each of the embodiments described above, electric power data that is used in a prediction process and a learning data update process may be limited to electric power data acquired from a predetermined appliance that is highly frequently used during presence (as with the appliances mentioned in Modification 3).

Thus, Modification 5 performs a prediction process and a learning data update process using electric power data acquired solely from an appliance that is highly frequently used during presence, and can therefore achieve further highly accurate presence and absence prediction based on electric power data.

<Modification 6>

In each of the embodiments described above, after having transmitted presence and absence information to the delivery terminal 400, the home-delivery management server 300 may transmit, to a terminal that is used by a person who belongs to the building 100 (e.g., a resident of the building 100, a person who works in the building 100, or the like), notification information indicating that the home-delivery management server 300 has outputted the presence and absence information to the delivery terminal 400. It should be noted that the notification information may be information that indicates the home-delivery management server 300 has outputted the presence and absence information to the delivery terminal 400.

Thus, Modification 6 allows the person who belongs to the building to grasp, by looking at the notification information, that there is a visit by an employee of the home-delivery company.

It should be noted that the foregoing description takes, as an example, a case where the home-delivery management server 300 performs a process for transmitting notification information (e.g., the cases of Embodiments 1 and 2); however, in a case where the delivery terminal 400 performs a prediction process, the delivery terminal 400 may transmit the notification information to the terminal that is used by the person who belongs to the building 100 (e.g., the cases of Embodiments 3 and 4). That is, the weighting process described in Modification 6 is applicable to any of Embodiments 1 to 4.

Further, the terminal that is used by the person who belongs to the building 100 may for example acquire electric power data of the building 100 from the power management apparatus 104 or the electric power data management server 200 and display the electric power data. This allows the person of the building 100 to grasp the electric power data.

<Modification 7>

In each of the embodiments described above, in a case where the home-delivery management server 300 has predicted the presence or absence of a person for each of a plurality of buildings, the home-delivery management server 300 may calculate a delivery route on the basis of a plurality of prediction results (e.g., the probability of presence and the probability of absence for each building) and map information (e.g., map data on a territory of the home-delivery company) and transmits, to the delivery terminal 400, delivery route information indicating the delivery route thus calculated. This allows the delivery route information to be displayed by the delivery terminal 400.

For example, the delivery route is a route that allows passage through the buildings in descending order of probability of presence. Further, for example, the delivery route may be a route that allows preferential passage through an area where there are a predetermined or larger number of buildings whose probabilities of presence are equal to or greater than a predetermined threshold. Furthermore, for example, in a case where there is a building whose probability of absence is equal to or greater than a predetermined threshold, the delivery route may further include a predetermined package-keeping place (e.g., a place such as a convenience store or a post office that keeps packages instead of the building) instead of the building.

Furthermore, the home-delivery management server 300 may calculate an estimated time of arrival at each of the buildings on the basis of the delivery route thus calculated, a designated time of start of delivery, the map information, and a predetermined speed (e.g., a moving speed of an employee of the home-delivery company), and may transmit, to the delivery terminal 400, estimated-time-of-arrival information indicating each of the estimated times of arrival thus calculated. This allows the estimated-time-of-arrival information to be displayed by the delivery terminal 400.

Furthermore, the home-delivery management server 300 may calculate, on the basis of the delivery route thus calculated, the designated time of start of delivery, the map information, and the predetermined speed, a time at which delivery is estimated to be completed in a case where it is performed along the delivery route (hereinafter referred to as "estimated time of completion of delivery"), and may transmit, to the delivery terminal 400, estimated-time-of-completion-of-delivery information indicating the estimated time of completion of delivery thus calculated. This allows the estimated-time-of-completion-of-delivery information to be displayed by the delivery terminal 400.

Thus, Modification 7 allows the employee of the home-delivery company to grasp the delivery route, the estimated time of arrival at each building, and the time of start of delivery in addition to the prediction results on the plurality of buildings, thus making it easy for him/her to execute his/her duties.

It should be noted that the foregoing description takes, as an example, a case where the home-delivery management server 300 performs the process for generating delivery route information, estimated-time-of-arrival information, and estimated-time-of-completion-of-delivery information (e.g., the cases of Embodiments 1 and 2); however, in a case where the delivery terminal 400 performs a prediction process, the delivery terminal 400 may perform the process for generating delivery route information, estimated-time-of-arrival information, and estimated-time-of-completion-of-delivery information (e.g., the cases of Embodiments 3 and 4). That is, the weighting process described in Modification 6 is applicable to any of Embodiments 1 to 4.

In the foregoing, modifications of the embodiments have been described. It should be noted that the modifications described above may be arbitrarily combined.

(Example of Achievement by Computer Program)

In the foregoing, the embodiments and modifications according to the present disclosure have been described in detail with reference to the drawings. The functions of the electric power data management server 200, the home-delivery management server 300, and the delivery terminal 400 (hereinafter referred to as "apparatuses") may be achieved by a computer program.

Figure 13:
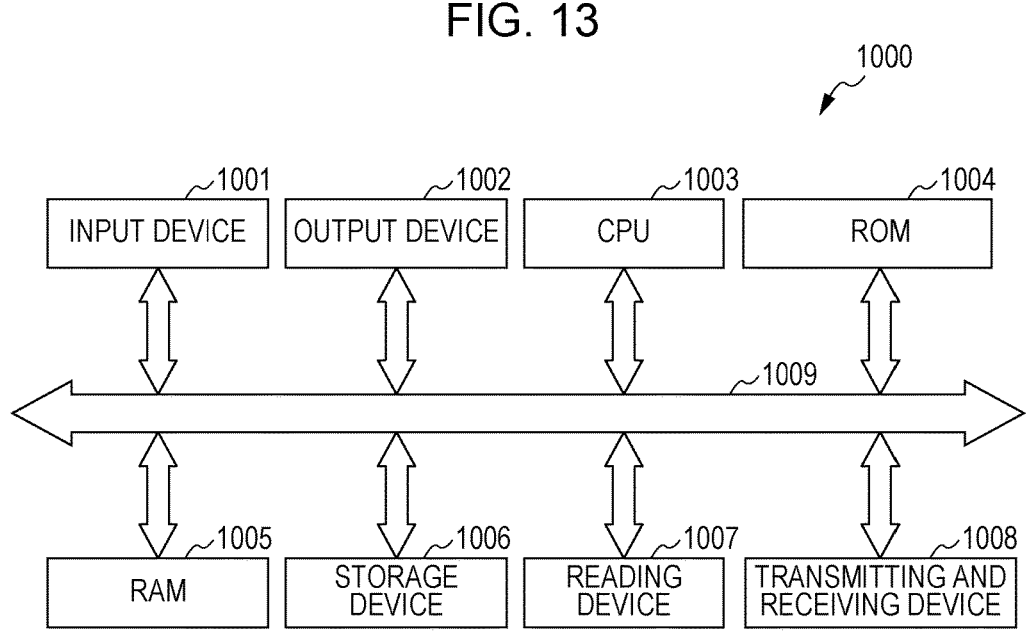
FIG. 13 is a diagram showing a hardware configuration of a computer that uses software to achieve functions of a server and a terminal according to each of the embodiments of the present disclosure.

FIG. 13 is a diagram showing a hardware configuration of a computer that programmatically achieves a function of each component. The computer 1000 includes an input device 1001 such as an input button or a touch pad, an output device 1002 such as a display or a speaker, a CPU (central processing unit) 1003, a ROM (read-only memory) 1004, and a RAM (random access memory) 1005. Further, the computer 1000 includes a storage device 1006 such as a hard disk device or an SSD (solid state drive), a reading device 1007 that reads information from a storage medium such as a DVD-ROM (digital versatile disk read-only memory) or a USB (universal serial bus) memory, a transmitting and receiving device 1008 that performs communication via a network. These components are connected to one another via a bus 1009.

Moreover, from a storage medium storing a program for achieving the function of each of the components, the reading device 1007 reads the program, and stores the program thus read in the storage device 1006. Alternatively, the transmitting and receiving device 1008 performs communication with a server device connected to the network, downloads, from the server device, a program for achieving the function of each of the components, and stores the program in the storage device 1006.

Then, the CPU 1003 copies, into the RAM 1005, the program stored in the storage device 1006, sequentially reads out commends contained in the program from the RAM 1005, executes the commands, and thereby achieves the function of each of the components. Further, in executing the program, information obtained by the various types of processing described in the embodiments is stored in the RAM 1005 or the storage device 1006 for use as appropriate.

(Types of Cloud Service)

Further, the technology described in each of the above embodiments and modifications may be achieved in any of the following types of cloud service. Note, however, that the type in which the technology described in each of the above embodiments and modifications is achieved is not limited to these types.

(Type 1 of Service: Company's Own Data Center Type)

Figure 14:
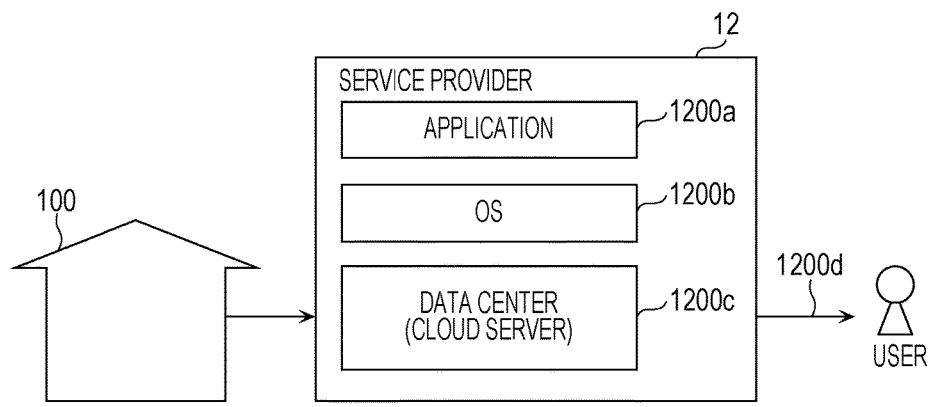
FIG. 14 is a diagram showing a type 1 of service (company's own data center type)

FIG. 14 is a diagram showing a type 1 of service (company's own data center type). The type 1 is a type in which a service provider 12 acquires information from a building 100 and provides a service to a user. In the type 1, the service provider 12 functions as a data center operating company. That is, the service provider 12 possesses a cloud server 1200c that manages big data (i.e., a virtualized server that cooperates with various appliances via the Internet). Therefore, no data center operating company exists.

The data center operating company is, but is not limited to, a company that performs data management, management of the cloud server 1200c, operation of a data center that performs the data management and the management of the cloud server 1200c, and the like. For example, in a case where an appliance manufacturer who develops and manufactures one of the plurality of appliances that are used in the building 100 also performs the data management, the management of the cloud server 1200c, and the like, the appliance manufacturer corresponds to the data center operating company. Further, the data center operating company is not limited to one company. For example, in a case where the appliance manufacturer and a management company perform the data management and the management of the cloud server 1200c in a cooperative or sharing manner, both or either of them correspond(s) to the data center operating company. It should be noted that the definition of the data center operating company given here also applies to the after-mentioned types 2 to 4.

In the type 1, the service provider 12 operates and manages a data center (cloud server) 1200c. Further, the service provider 12 manages an OS 1200b and an application 1200a. The service provider 12 provides a service to the user with the OS 1200b and the application 1200a managed by the service provider 12 (1200d).

(Type 2 of Service: IaaS-Based Type)

Figure 15:
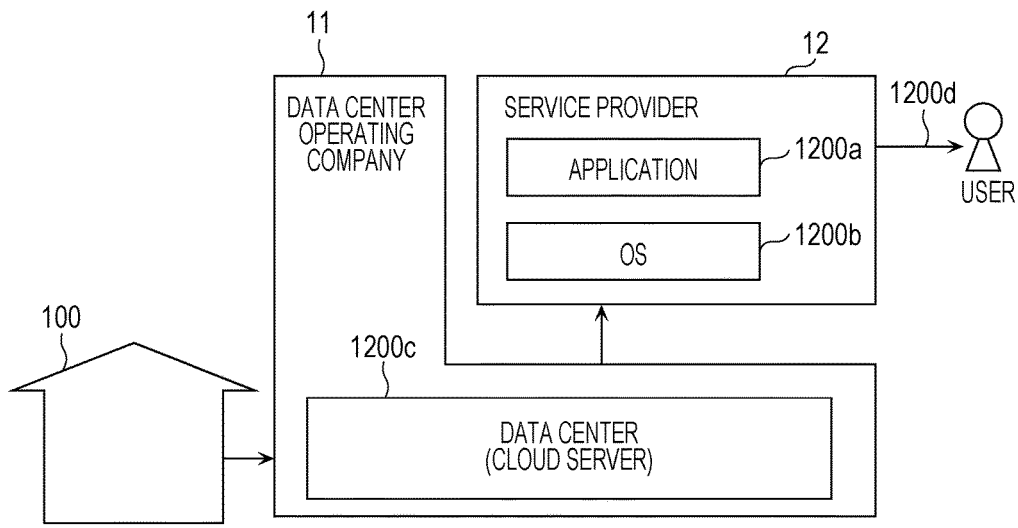
FIG. 15 is a diagram showing a type 2 of service (IaaS-based type)

FIG. 15 is a diagram showing a type 2 of service (IaaS-based type). The term "IaaS" here is the abbreviation of "infrastructure as a service", and means a cloud service providing model in which an infrastructure for building and operating a computer system per se is provided as a service via the Internet.

In the type 2, a data center operating company 11 operates and manages a data center (cloud server) 1200c. Further, the service provider 12 manages an OS 1200b and an application 1200a. The service provider 12 provides a service to the user with the OS 1200b and the application 1200a managed by the service provider 12 (1200d).

(Type 3 of Service: PaaS-Based Type)

Figure 16:
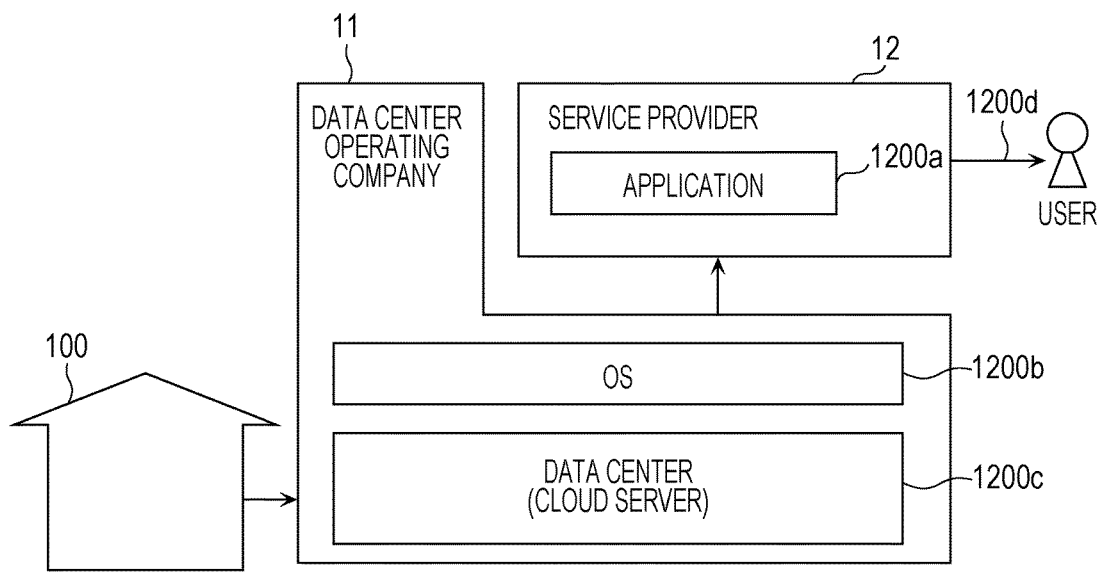
FIG. 16 is a diagram showing a type 3 of service (PaaS-based type)

FIG. 16 is a diagram showing a type 3 of service (PaaS-based type). The term "PaaS" here is the abbreviation of "platform as a service", and means a cloud service providing model in which a platform serving as a basis for building and operating software is provided as a service via the Internet.

In the type 3, the data center operating company 11 manages an OS 1200b and operates and manages a data center (cloud server) 1200c. Further, the service provider 12 manages an application 1200a. The service provider 12 provides a service to the user with the OS 1200b managed by the data center operating company 11 and the application 1200a managed by the service provider 12 (1200d).

(Type 4 of Service: SaaS-Based Type)

Figure 17:
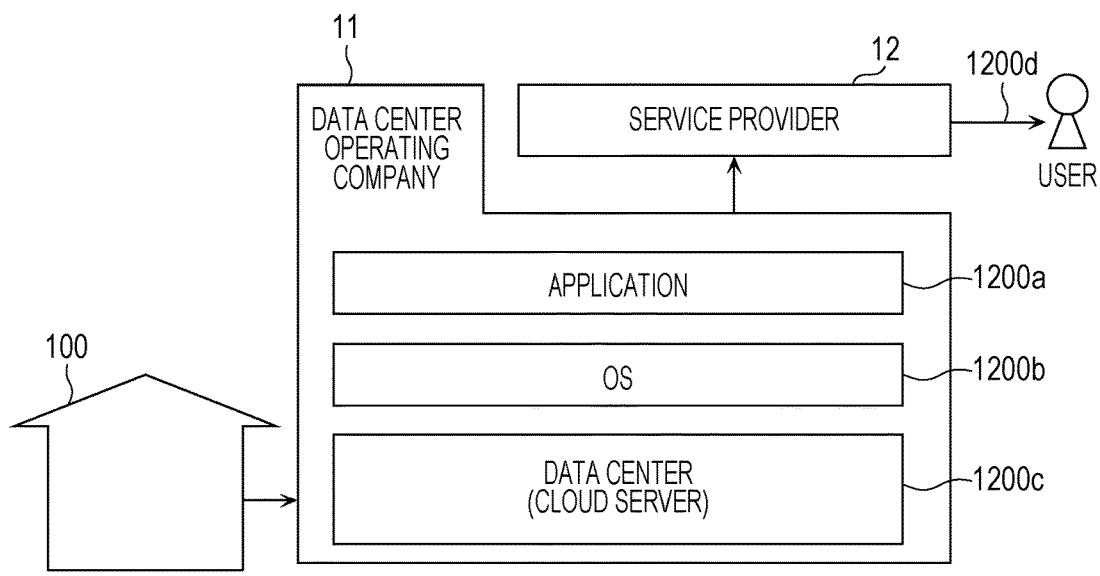
FIG. 17 is a diagram showing a type 4 of service (SaaS-based type).

FIG. 17 is a diagram showing a type 4 of service (SaaS-based type). The term "SaaS" here is the abbreviation of "software as a service". For example, the term "SaaS" means a cloud service providing model including a function that allows a company or individual (user) who does not possess a data center (cloud server) to use, via a network such as the Internet, an application provided by a platform provider who possesses a data center (cloud server).

In the type 4, the data center operating company 11 manages an application 1200a, manages an OS 1200b, and operates and manages a data center (cloud server) 1200c. Further, the service provider 12 provides a service to the user with the OS 1200b and the application 1200a managed by the data center operating company 11 (1200d).

In any of the foregoing types, the service provider 12 performs service providing actions. Further, for example, the service provider 12 or the data center operating company 11 may develop an OS, an application, or a database of big data by itself or may outsource the development to a third party.

A presence and absence prediction method in the present disclosure are not limited to the above embodiments, and have, for example, configurations described in the following items.

Item 1

A presence and absence prediction method comprising:

acquiring electric power data of a predetermined building at a first point in time;

acquiring learning data obtained by learning, for each predetermined time period, a correspondence relationship between electric power data of the building at a point in time preceding the first point in time and information indicating whether the person was actually present in the building;

predicting, on the basis of the electric power data of the building at the first point in time and the learning data, whether the person is present in the building; and generating presence and absence information that indicates a result of the prediction and outputting the presence and absence information to a predetermined terminal.

Item 2

The presence and absence prediction method according to Item 1, further comprising:

accepting inputting of track record information indicating whether the person was actually present in the building at or after the first point in time; and updating the learning data on the basis of the track record information and the electric power data of the building at the first point in time.

Item 3

The presence and absence prediction method according to Item 1, further comprising:

upon acquiring, within a predetermined period of time after the outputting of the presence and absence information, operation information regarding an operation performed on a predetermined appliance installed in the building, determining, on the basis of the operation information, whether the person was actually present in the building; and updating the learning data on the basis of a result of the determination and the electric power data of the building at the first point in time.

Item 4

The presence and absence prediction method according to Item 3, wherein the predetermined appliance is an intercom, the presence and absence prediction method further comprising:

in a case where the operation information indicates that a response operation was performed in response to a call from a visitor, determining the person was actually present in the building; and in a case where the operation information indicates that no response operation was performed in response to a call from a visitor, determining the person was not actually present in the building.

Item 5

The presence and absence prediction method according to Item 3, wherein the predetermined appliance is a security system, the presence and absence prediction method further comprising:

in a case where the operation information indicates that an operation of setting a monitoring mode of monitoring the building during absence was performed, determining the person was not actually present in the building; and in a case where the operation information indicates that an operation of canceling the monitoring mode was performed, determining the person was actually present in the building.

Item 6

The presence and absence prediction method according to Item 1, wherein the learning data is data in which a first total value and a second total value are associated with each of plural pieces of electric power data of the building, the first total value being obtained by summating the number of times the person was actually in the building, the second total value being obtained by summating the number of times the person was not actually in the building, the presence and absence prediction method further comprising:

specifying, from the learning data, the first and second total values that correspond to the electric power data of the building at the first point in time;

calculating at least either a probability of presence or a probability of absence on the basis of the first and second total values thus specified; and generating the presence and absence information on the basis of either the probability of presence or the probability of absence thus calculated.

Item 7

The presence and absence prediction method according to Item 1, wherein the electric power data is data that represents an amount of power consumption.

Item 8

The presence and absence prediction method according to Item 1, wherein the electric power data is data that represents a waveform of power consumption.

Item 9

The presence and absence prediction method according to Item 1, further comprising:

acquiring, in addition to the electric power data of the building at the first point in time, plural pieces of electric power data of the building during a predetermined period of time based on the first point in time; and in a case where there is a change that is equal to or greater than a threshold in the plural pieces of electric power data of the building during the predetermined period of time, assigning a weight to the result of the prediction according to the change.

Item 10

The presence and absence prediction method according to Item 1, further comprising:

further acquiring appliance data that indicates an operating appliance; and in a case where the operating appliance indicated by the appliance data is a predetermined appliance that is highly frequently used during presence, assigning a greater weight to the result of the prediction that the person is present in the building.

Item 11

The presence and absence prediction method according to Item 10, further comprising, in a case where the operating appliance indicated by the appliance data is a television, assigning a greater weight to the result of the prediction that the person is present in the building than in a case where the operating appliance indicated by the appliance data is a washing machine.

Item 12

The presence and absence prediction method according to Item 1, wherein the learning data is data obtained by further learning the correspondence relationship for at least one of elements, the elements being days of a week, months, weather, outside air temperature, humidity, and seasons.

Item 13

The presence and absence prediction method according to Item 1, wherein the electric power data is electric power data of a predetermined appliance that is highly frequently used during presence.

Item 14

The presence and absence prediction method according to Item 1, wherein the electric power data is data obtained by summating electric power data of each appliance installed in the building or data obtained by summating electric power data of each branch circuit installed in the building.

Item 15

The presence and absence prediction method according to Item 1, wherein the predetermined terminal is a terminal that is used by a home-delivery company, and the first point in time is a point in time where the home-delivery company performed an operation of instructing the terminal to display the presence and absence information.

Item 16

The presence and absence prediction method according to Item 1, further comprising transmitting, to a terminal that is used by a person who belongs to the building, notification information indicating that the presence and absence information has been outputted to the predetermined terminal.

Item 17

The presence and absence prediction method according to Item 1, further comprising:

calculating a delivery route on the basis of the result of the prediction and map information in a case of having predicted, for each of a plurality of building, whether a person is present; and outputting, to the predetermined terminal, information indicating the delivery route.

Item 18

The presence and absence prediction method according to Item 17, further comprising calculating the delivery route to allow preferential passage through an area where there are a predetermined or larger number of buildings in which persons are predicted to be present.

Item 19

The presence and absence prediction method according to Item 17, further comprising:

calculating an estimated time of arrival at each of the plurality of buildings on the basis of the delivery route, a designated time of start of delivery, the map information, and a predetermined speed; and outputting, to the predetermined terminal, information indicating the estimated time of arrival.

Item 20

The presence and absence prediction method according to Item 17, further comprising:

calculating, on the basis of the delivery route, a designated time of start of delivery, the map information, and a predetermined speed, an estimated time of completion of delivery at which delivery is estimated to be completed in a case where it is performed along the delivery route; and outputting, to the predetermined terminal, information indicating the estimated time of completion of delivery.

Item 21

A presence and absence prediction apparatus comprising:

an electric power data acquirer that acquires electric power data of a predetermined building at a first point in time; and a predictor that predicts, on the basis of learning data obtained by learning, for each predetermined time period, a correspondence relationship between electric power data of the building at a point in time preceding the first point in time and information indicating whether the person was actually present in the building and the electric power data of the building at the first point in time, whether the person is present in the building, and that generates presence and absence information that indicates a result of the prediction.

Item 22

The presence and absence prediction apparatus according to Item 21, further comprising a transmitter that transmits the presence and absence information to a predetermined terminal.

Item 23

The presence and absence prediction apparatus according to Item 21, further comprising an outputter that outputs the presence and absence information.

The present disclosure is suitable for use in a presence and absence prediction method and a presence and absence prediction apparatus for predicting the presence or absence of a human in a predetermined place.

What is claimed is:

1. A presence and absence prediction method comprising:

acquiring, by a communication device, electric power data of a predetermined building at a first point in time;

acquiring, by the communication device, learning data obtained by learning, for each predetermined time period, a correspondence relationship between the electric power data of the building at a point in time preceding the first point in time and information indicating whether a person was actually present in the building;

predicting, by a processor and based on the electric power data of the building at the first point in time and the learning data, whether the person is present in the building; and generating, by the processor, presence and absence information that indicates a result of the prediction and outputting the presence and absence information to a predetermined terminal, wherein the learning data is data in which a first total value and a second total value are associated with each of plural pieces of electric power data of the building during a predetermined time, the first total value being obtained by summating a number of times the person was actually in the building, the second total value being obtained by summating a number of times the person was not actually in the building, and the presence and absence prediction method further comprises:

specifying, by the processor and from the learning data, the first and second total values that correspond to the electric power data of the building at the first point in time;

calculating, by the processor, at least either a probability of presence or a probability of absence based on the first and second total values; and generating, by the processor, the presence and absence information based on either the probability of presence or the probability of absence.

2. The presence and absence prediction method according to claim 1, further comprising:
accepting an input of track record information indicating whether the person was actually present in the building at or after the first point in time; and
updating the learning data based on the track record information and the electric power data of the building at the first point in time.

3. The presence and absence prediction method according to claim 1, further comprising:
upon acquiring, within a predetermined period of time after the outputting of the presence and absence information, operation information regarding an operation performed on a predetermined appliance installed in the building, determining, based on the operation information, whether the person was actually present in the building; and
updating the learning data based on a result of the determination and the electric power data of the building at the first point in time.

4. The presence and absence prediction method according to claim 3, wherein the predetermined appliance is an intercom,
the presence and absence prediction method further comprises:
when the operation information indicates that a response operation was performed in response to a call from a visitor, determining the person was actually present in the building; and
when the operation information indicates that no response operation was performed in response to the call from the visitor, determining the person was not actually present in the building.

5. The presence and absence prediction method according to claim 3, wherein the predetermined appliance is a security system,
the presence and absence prediction method further comprises:
when the operation information indicates that an operation of setting a monitoring mode of monitoring the building during an absence of the person was performed, determining that the person was not actually present in the building; and
when the operation information indicates that an operation of canceling the monitoring mode was performed, determining that the person was actually present in the building.

6. The presence and absence prediction method according to claim 1, wherein the electric power data is data that represents an amount of power consumption.

7. The presence and absence prediction method according to claim 1, further comprising:
acquiring, by the communication device, in addition to the electric power data of the building at the first point in time, plural pieces of electric power data of the building during a predetermined period of time based on the first point in time; and
when there is a change that is equal to or greater than a threshold in the plural pieces of electric power data of the building during the predetermined period of time, assigning, by the processor, a weight to the result of the prediction according to the change.

8. The presence and absence prediction method according to claim 1, further comprising:
acquiring, by the communication device, appliance data that indicates an operating appliance; and
when the operating appliance indicated by the appliance data is a predetermined appliance that is used above a certain threshold during a presence of the person, assigning, by the processor, a greater weight to the result of the prediction that the person is present in the building.

9. The presence and absence prediction method according to claim 8, further comprising, when the operating appliance indicated by the appliance data is a television, assigning, by the processor, a greater weight to the result of the prediction that the person is present in the building than when the operating appliance indicated by the appliance data is a washing machine.

10. The presence and absence prediction method according to claim 1, wherein the learning data is data obtained by further learning the correspondence relationship for at least one of days of a week, months, weather, outside air temperature, humidity, and seasons.

11. The presence and absence prediction method according to claim 1, wherein the electric power data is electric power data of a predetermined appliance that is used above a certain threshold during a presence of the person.

12. The presence and absence prediction method according to claim 1, wherein the electric power data is data obtained by summating electric power data of each appliance installed in the building or data obtained by summating electric power data of each branch circuit installed in the building.

13. The presence and absence prediction method according to claim 1, wherein the predetermined terminal is a terminal that is used by a home-delivery company, and
the first point in time is a point in time where the home-delivery company performed an operation of instructing the terminal to display the presence and absence information.

14. The presence and absence prediction method according to claim 1, further comprising transmitting, by the communication device, to a terminal that is used by a person who belongs to the building, notification information indicating that the presence and absence information has been outputted to the predetermined terminal.

15. The presence and absence prediction method according to claim 1, further comprising:
calculating, by the processor, a delivery route based on the result of the prediction and map information when a prediction of whether a person is present has been performed, for each of a plurality of buildings; and
outputting, to the predetermined terminal, information indicating the delivery route.

16. The presence and absence prediction method according to claim 15, further comprising calculating, by the processor, the delivery route to allow preferential passage through an area where there is a predetermined number or a larger number of buildings in which persons are predicted to be present.

17. The presence and absence prediction method according to claim 15, further comprising:
calculating, by the processor, an estimated time of arrival at each of the plurality of buildings based on the delivery route, a designated time of start of delivery, the map information, and a predetermined speed; and
outputting, to the predetermined terminal, information indicating the estimated time of arrival.

18. The presence and absence prediction method according to claim 15, further comprising:

calculating, based on the delivery route, a designated time of start of delivery, the map information, and a predetermined speed, an estimated time of completion of delivery at which delivery is estimated to be completed when the delivery is performed along the delivery route; and outputting, to the predetermined terminal, information indicating the estimated time of completion of delivery.

19. A presence and absence prediction apparatus comprising:

a communication device that acquires electric power data of a predetermined building at a first point in time; and a processor that predicts, based on learning data obtained by learning, for each predetermined time period, a correspondence relationship between electric power data of the building at a point in time preceding the first point in time and information indicating whether the person was actually present in the building and the electric power data of the building at the first point in time, whether the person is present in the building, and that generates presence and absence information that indicates a result of the prediction, wherein the learning data is data in which a first total value and a second total value are associated with each of plural pieces of electric power data of the building during a predetermined time, the first total value being obtained by summating a number of times the person was actually in the building, the second total value being obtained by summating a number of times the person was not actually in the building, and the processor further specifies, from the learning data, the first and second total values that correspond to the electric power data of the building at the first point in time;

calculates at least either a probability of presence or a probability of absence based on the first and second total values; and generates the presence and absence information based on either the probability of presence or the probability of absence.

* * * * *